United States Patent [19]
Burroughs et al.

[11] Patent Number: 5,956,725
[45] Date of Patent: Sep. 21, 1999

[54] SCHEMA MAPPING TO A LEGACY TABLE WITH PRIMARY AND FOREIGN KEY SUPPORT

[75] Inventors: Tracy Kim Burroughs, Byron; Steven John Gansemer, Rochester; Wilson D. Lee, Rochester; Erik E. Voldal, Rochester; Cynthia Ann Rogers, Rochester; Laura Jane Zaborowski, Winona, all of Minn.

[73] Assignee: Interanational Business Machines Corporation, Armonk, N.Y.

[21] Appl. No.: 08/978,656

[22] Filed: Nov. 26, 1997

[51] Int. Cl.[6] .................................................. G06F 17/30
[52] U.S. Cl. ........................ 707/101; 707/100; 395/705
[58] Field of Search ..................... 707/1–10, 100–104, 707/200–206; 395/702, 705; 364/280.4, 283.4

[56] References Cited

U.S. PATENT DOCUMENTS

| | | | |
|---|---|---|---|
| 5,613,099 | 3/1997 | Erickson et al. | 395/500 |
| 5,838,965 | 11/1998 | Kavanagh et al. | 707/103 |
| 5,870,749 | 2/1999 | Adusumilli | 707/101 |
| 5,872,973 | 2/1999 | Mitchell et al. | 395/702 |
| 5,878,411 | 3/1999 | Burroughs et al. | 707/4 |

OTHER PUBLICATIONS

Enabling the Integration of Object Applications with Relational Databases, by Arthur Keller, Ph.D., Richard Jensen, and Shailesh Agrawal, Ph.D., Persistence Software, Mar. 24, 1997 Inc.,www.persistence.com/pesr...ce/pagetwo.pages/technoview.html, pp. 1–9.

Java Relational Binding Delivers Transparent Java Access to Relational Databases, http://www.02tech.com, $O_2$ Technology, Oct. 7, 1996.

XDB's Jet Series (Java Enterprise Tools), XDB Systems, http://www.xdb.com/jet, Mar. 24, 1997.

Jetstore, XDB Systems, http://www.xdb.com/jet/store, p. 1, Mar. 24, 1997.

Jetassist Instant Database Applet Development for Java, XDB Systems, http://www.xdb.com/jet/assist, pp. 1–2, Mar. 24, 1997.

Jetconnect Universal Database Access for Java, XDB Systems, http://www.xdb.com/jet/connect, pp. 1–2, Mar. 24, 1997.

Objectstore DBConnect, ObjectStore Database for the Web http://www.odi.com/products/apc/ap_connect.html, pp. 1–5, Mar. 24, 1997.

Welcome to $O_2$ Technology Database Solutions for Object Developers, http://www.02tech.fr, pp. 1–2, Mar. 24, 1997.

*Primary Examiner*—Ruay Lian Ho
*Attorney, Agent, or Firm*—Lawrence D. Maxwell

[57] ABSTRACT

A method and system for mapping an object and an associated handle between the object-oriented schema of an application program and the relational schema of a database in which the object is persisted. The handle is reconstructed in response to a run-time request by an application program to instantiate the object. The handle may be an independent handle or an embedded handle. The relationships afforded by primary keys and foreign keys in a legacy, i.e., existing, relational database, can be preserved by mapping them to the independent and embedded handles, respectively. The mapping is performed prior to application program run-time, and is defined in a high-level schema mapping language, which may be generated with the aid of a schema mapping software tool.

15 Claims, 16 Drawing Sheets

SCHEMA MAPPING TO A LEGACY TABLE WITH PRIMARY AND FOREIGN KEY SUPPORT

CROSS-REFERENCE TO RELATED APPLICATIONS

Ser. No. 08/883,838, filed Jun. 26, 1997, entitled "DEPENDENT PERSISTENCE," and Ser. No. 08/912,020, filed Aug. 15, 1997, entitled "LEGACY SUBCLASSING," are related.

BACKGROUND OF THE INVENTION

1. Field of the Invention

The present invention relates generally to object-oriented computing and relational data store systems. More specifically, the present invention relates to a method and system for mapping between the schema of an object-oriented application program and the schema of legacy or preexisting relational database tables in which the mapping includes a relationship between a handle of an object and a primary key or foreign key of a table.

2. Description of the Related Art

Businesses commonly need to store and access large quantities of data relating to specific business matters, such as their financial accounts, inventory, customers, employees, and other matters. Businesses use computers, of course, to aid this task. Businesses have invested billions of dollars in computer systems that store and access such business data. To minimize losses on this investment in computer systems, an important consideration in introducing new computer technology is adapting it to interface with existing computer technology.

A database is a structure in which a computer system may store a large quantity of data organized in a manner that facilitates efficient storage, search and retrieval. Physically, at the heart of any database is some suitable type of data store, such as magnetic disks, on which data may be recorded. Nevertheless, computer scientists and other researchers have developed a number of different conceptual models under which databases may be constructed.

The most prevalent database model is known as a relational database. In a relational database the data are organized in tables, also referred to as relations. Each data element in a table is indexed by its row and column in the table. Each row, also known as a tuple, represents an entity that is useful or meaningful to the business or other database user, and each column in that row refers to a data element that defines a characteristic or attribute of that entity. For example, each row in a company's database of its employees may refer to a certain employee. One column may refer to an employee's name, another column to an employee's identification number, and another column to an employee's address. Certain columns may be designated as "keys" to uniquely identify each row. For example, the column referring to an employee's name may be defined as a key. Keys may include primary keys, which are used as the primary means to access the rows, and foreign keys, which are used to define links between tables. The programmer who creates the database has considerable latitude in specifying the rows, columns, keys, and other characteristics that define the schema of a relational database.

The above-described data model underlying relational databases was developed to facilitate the storage and retrieval of data under the control of programming languages of the type that were prevalent at the time, which were primarily those known as procedural or structured programming languages. Because procedural programming languages and relational databases were for many years being developed and improved upon contemporaneously with one another, procedural languages are, not surprisingly, well-suited to manipulating relational database data. For example, a feature of most procedural programming languages allows a programmer to access an element of a table by specifying its row and column. Although a program would not necessarily access a database element using that feature of the programming language, the point to note is that relational schema and procedural programming share common concepts and programming philosophies.

Another type of programming, known as object-oriented programming (OOP), is becoming increasingly popular and may eventually supplant procedural programming. A potential problem, however, is that OOP languages do not inherently interface smoothly with relational databases. For example, the concept of indexing a table of data elements by row and column is in itself somewhat at odds with the OOP philosophy of handling an object in accordance with what it represents rather than how it is represented in a rigid data structure.

The goal of OOP is to reduce the time and costs associated with developing complex software by creating small, reusable sections of program code that can be quickly and easily combined and re-used to create new programs. The code sections are known as objects. OOP languages, such as Smalltalk, C++, and Java, have been developed that allow programmers to approach their programming tasks in a way that is believed to be more natural and intuitive than that in which programmers traditionally approached tasks armed with only the tools of procedural programming languages. Using the unique tools or features of an OOP language, which are described below in further detail, a programmer can write code to define a software object that models something in the real world. The software object may model the attributes or characteristics of the real-world object and, in many cases, may also model its behavior. For example, a programmer whose task it is to create an employee database program can create an object that models an employee. An employee object may have certain attributes of a real employee, such as a name, an address, an employee number, and so forth. Exploiting the full capabilities of OOP, a programmer could use the employee object in a program in a manner that roughly corresponds to the way one would interact with a real employee. For example, the programmer could define the employee object to provide its address when the object is asked for that information or to provide its status, such as "on vacation," when asked for status information. It should be noted that accessing an element of a table by specifying a row and column is a concept foreign to object-oriented programmers and not in keeping with the OOP philosophy of modeling things in the real world in a natural, intuitive manner.

Object-oriented databases (OODBs) that are specifically designed to facilitate storage and retrieval of objects have been developed. Objects that are stored in a data store are known as persistent objects because they "persist" after the program that created them ceases executing.

Despite the recent development of dedicated OODBs, businesses have invested billions of dollars over the years in their existing or legacy relational databases. It would be an extraordinarily uneconomical task to transfer all legacy relational data into OODBs. Furthermore, relational databases are continuing to be developed and improved and remain widely commercially available. Therefore, software has been developed that interfaces object-oriented software to relational databases. Such software typically includes a development tool, sometimes referred to as a schema mapper, that allows a database programmer to map the object schema to the relational schema. The software also typically includes a call-level interface. The call-level interface acts as a translator between an object-oriented application program and a relational database. Thus, although the objects are ultimately stored in relational format, the storage format is transparent to the application program, which may access them in the same manner as it would a persistent object in a dedicated OODB. An example of such software is described in U.S. Pat. No. 5,629,979, titled "A SYSTEM AND METHOD FOR PROVIDING A GRAPHICAL USER INTERFACE FOR MAPPING AND ACCESSING OBJECTS IN DATA STORES," (IBM Docket ST9-94-017) incorporated herein by reference, and its related U.S. patent application Ser. No. 08/276,382, filed Jul. 18, 1994, titled "A SYSTEM AND METHOD FOR MAPPING AND ACCESSING OBJECTS IN DATA STORES" (IBM Docket ST9-94-016).

The present invention addresses the problems involved in mapping between a legacy relational schema in which primary and foreign keys are used and an object-oriented schema in which handle objects are used to reference other ("entity") objects. There is a need for a mechanism that links the unique identity of an object to the unique identity of the row containing the persistent state for the object. The present invention addresses these problems in the manner described below.

SUMMARY OF THE INVENTION

The present invention relates to a method and system for mapping an object and an associated handle between the object-oriented schema of an application program and the relational schema of a database in which the object is persisted, wherein the handle is reconstructed in response to a run-time request by an application program to instantiate the object. As defined below, the handle may be an independent handle or an embedded handle. The invention preserves the relationships afforded by primary keys and foreign keys in a legacy, i.e., existing, relational database, by mapping them to the independent and embedded handles, respectively.

The mapping is performed prior to the time an application program is run ("run-time"), and is defined in a high-level schema mapping language, which may be generated with the aid of a schema mapping software tool. In response to a request to restore or instantiate a persistent object, the instance variables of the handle as well as the object itself are restored or "fluffed" with data retrieved from a relational database in which the object's persistent state is stored. The database columns from which to retrieve the data are determined by the mapping.

The present invention is used in an object-oriented system or framework in which handle objects are used to reference other, persistent objects, which may sometimes be referred to in this patent specification as entities to distinguish them from handles and from non-persistent objects. The invention may be used to map both an independent handle of an object as well as any embedded handles the object might contain. Objects that have no unique identity and thus cannot be referenced by a handle are referred to in this specification as dependents. An independent handle differs from an embedded handle in that no association between objects is made with an independent handle. An independent handle is not a field of an object; rather, from the user's perspective it is a separate object that serves as a reference to the object and that provides the object with its unique identity. The present invention recognizes that the function of providing a unique identity is analogous to the function of a primary key of a relational database table. In contrast to an independent handle, an embedded handle is a field of an object. It is the mechanism that associates entities together which then make up a network of objects. The present invention recognizes that this function is analogous to the foreign key of a relational table.

The invention presents the user with considerable mapping flexibility. A user may select any of the following mapping methods, individually or in combination, to map either independent handles or embedded handles. The user may choose one method over another based on the database column definitions, the instance variables of the object's class definition, and other constraints.

If the legacy table has a primary key column, and the handle is an independent handle, a group of one or more instance variables of the independent handle may be directly mapped to the primary key column or columns. The user selects a group of instance variables that together define a unique identity for the object. The instance variables from among which the user may choose this group may be defined by a key object. The key object may impose a constraint on the mapping if none of its instance variables corresponds to any of the object's instance variables.

If the table does not have a primary key column, one or more new columns may be added to the existing database table that result in the formation of a primary key. The user selects a group of one or more instance variables that together define a unique identity for the object and maps them to the primary key column or columns of the table. The instance variables from among which the user may choose this group may be defined by a key object.

If the table has a primary key, but the primary key does not correspond in meaning to any instance variable of the entity associated with the handle, a sidetable, which is a new table in the database distinct from the table having the primary key, may be used as a link into the table. The user selects a group of one or more instance variables that together define a unique identity for the object and maps them to the primary key column or columns of the sidetable. The sidetable has a foreign key column or columns through which it is joined to the table.

Embedded handles may be mapped in essentially the same manner as independent handles. Whereas an independent handle is mapped to a primary key of a table, an embedded handle is mapped to a foreign key of a table. Any of the methods described above of directly mapping, adding a column, and using a sidetable may be used, individually or in combination.

The foregoing, together with other features and advantages of the present invention, will become more apparent when referring to the following specification, claims, and accompanying drawings.

DESCRIPTION OF PREFERRED EMBODIMENTS

Figure 1:
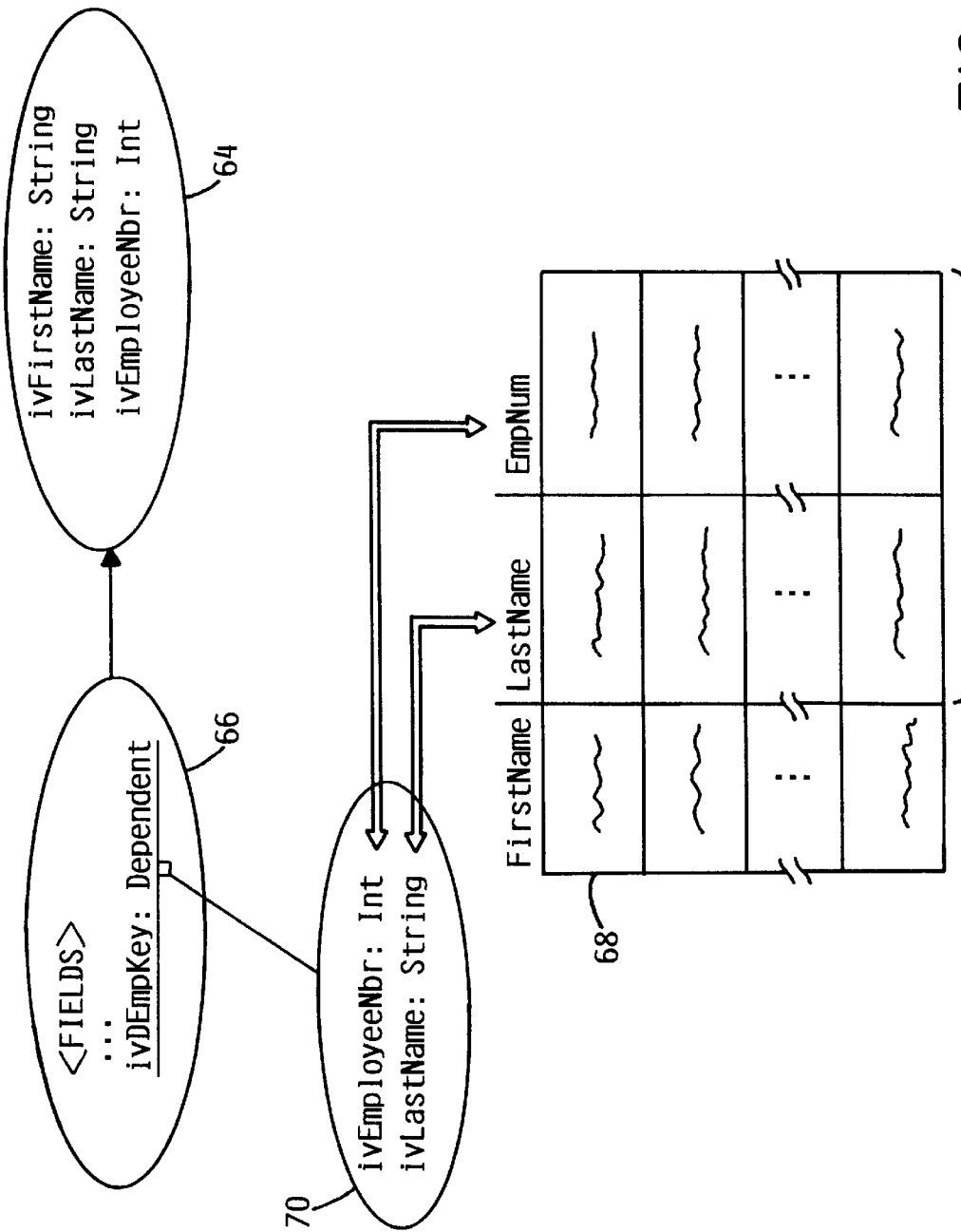
FIG. 1 is an object and database table diagram illustrating a method in which fields of an independent key object are directly mapped to columns of the table.

The present invention relates to a method and system for mapping an object and an associated handle between the object-oriented schema of an application program and the relational schema of a database in which the object is persisted. An Overview section is provided below for the benefit of readers who are not generally familiar with the problems that the present invention addresses. Readers who are skilled in the art of object-oriented programming (OOP) technology, relational database technology, and the implications of the intersection of these technologies, may wish to skip the Overview section and proceed directly to the Detailed Description section of this specification.

1. Overview

OOP differs from standard procedural programming in that it uses objects rather than procedures as the fundamental building blocks for creating computer programs. Both objects and procedures are embodied as sections of code that may be written in a high-level language. Nevertheless, how a programmer uses objects to design programs differs greatly from how a programmer uses procedures. Both OOP and procedural programming have as a goal to break a programming task into smaller, more manageable sub-tasks. Although a procedural programmer may break a program into a hierarchy of procedures, each of which performs an algorithm, the procedures are generally not autonomous. Thus, although a procedure lower in the hierarchy potentially could be re-used in a different program by a different procedure higher in the hierarchy, such re-use of code is not nearly as straightforward or intuitive as the re-use of objects.

A fundamental concept in OOP is the class. A class is a template or prototype that defines a type of object. A programmer may define a class by writing a section of code known as a class definition. An object is an instance of a class. An object is created or instantiated at run-time, i.e., when the computer executes a statement in the program calling for the instantiation of an object of a specified class. An object may include attributes or data as well as functions or methods. The class definition specifies the attributes and methods. The attributes are represented in an object by the values of instance variables.

Another important concept of OOP is encapsulation. Often, an object may perform its function without needing to reveal its implementation or internal data. A class definition may specify that the data of objects of that class is private and cannot be retrieved by another object. Objects must communicate with one another via their object interfaces, and the data may be encapsulated by limiting access to it through the object interface. Such data can only be modified by the object methods.

Another important concept of OOP is inheritance. Inheritance is the ability to derive a new class from one or more existing classes. The new class, known as a subclass, may inherit or incorporate all properties of a base class, including its attributes and its methods. The new class or subclass may be defined to include additional properties.

Objects communicate with one another by sending and receiving messages. A powerful concept of OOP, known as polymorphism, is that objects of different classes may respond to the same message in different ways. In this patent specification, the concept is referred to as invoking a method on an object.

Encapsulation, inheritance and polymorphism are three important concepts that differentiate OOP from procedural programming. Another concept that is featured in many OOP languages is known as aggregation or containment by value. A dependent, as the term is used in this patent specification, is a type of aggregation. A dependent object differs from other types of objects in that it is not shared. Rather, a dependent object is contained within another object, which may be referred to as an entity to distinguish it from dependents and other classes of objects.

A framework is a collection of base classes that extends the power of object-oriented systems. Stated another way, a framework is a set of cooperating classes that make up a reusable, extensible architecture. A framework functions as the operating environment. A programmer can use the base classes to derive more specialized classes that represent business objects or entities.

A persistent object can be preserved beyond the termination of the process that created that object. A framework that supports persistent objects includes methods that allow persistent objects to be stored in and retrieved from a non-volatile data store, such as a magnetic disk or writeable optical disk.

Object-oriented frameworks or systems typically provide a mechanism of some type by which an object can be referenced, a concept analogous to a pointer referencing a data structure. The mechanism includes some data that defines a unique identity for the object. The object can be distinguished by this unique identity from all other objects in the framework or system. For example, it is known that a framework may generate a universally unique identifier (UUID) for each object that is instantiated. A framework may define referencing objects that include this data. In the present patent specification, such an object is referred to as a handle. As described above, a handle may be an independent handle, which is presented to the user as an object entirely separate from the entity is references, or an embedded handle, which is a handle contained within an object as one of the object's fields. Nevertheless, an embedded handle references an entity in the same manner in which an independent handle references an entity.

The term "application program" is used in this specification to refer to any software process that processes data stored in a database. As described above, an application program may maintain information relating to a company's employees, such as their names, addresses and employee numbers, in a database, and allow a user to query the database to search for certain employees, or to add employees to the database, or to delete employees from the database. The schema mapping solution that the present invention addresses arises from the problems inherent in interfacing an object-oriented application program and a relational database.

An application program may perform an operation involving an entity that requires the entity be stored in the database, restored from the database, or deleted from the database. In the case of restoring an entity, restoring an independent handle to the entity is typically a prerequisite. Part of restoring an entity involves restoring any fields of the entity that are embedded handles. The present invention relates to restoring these handles in accordance with a mapping.

2. Detailed Description

Figure 10:
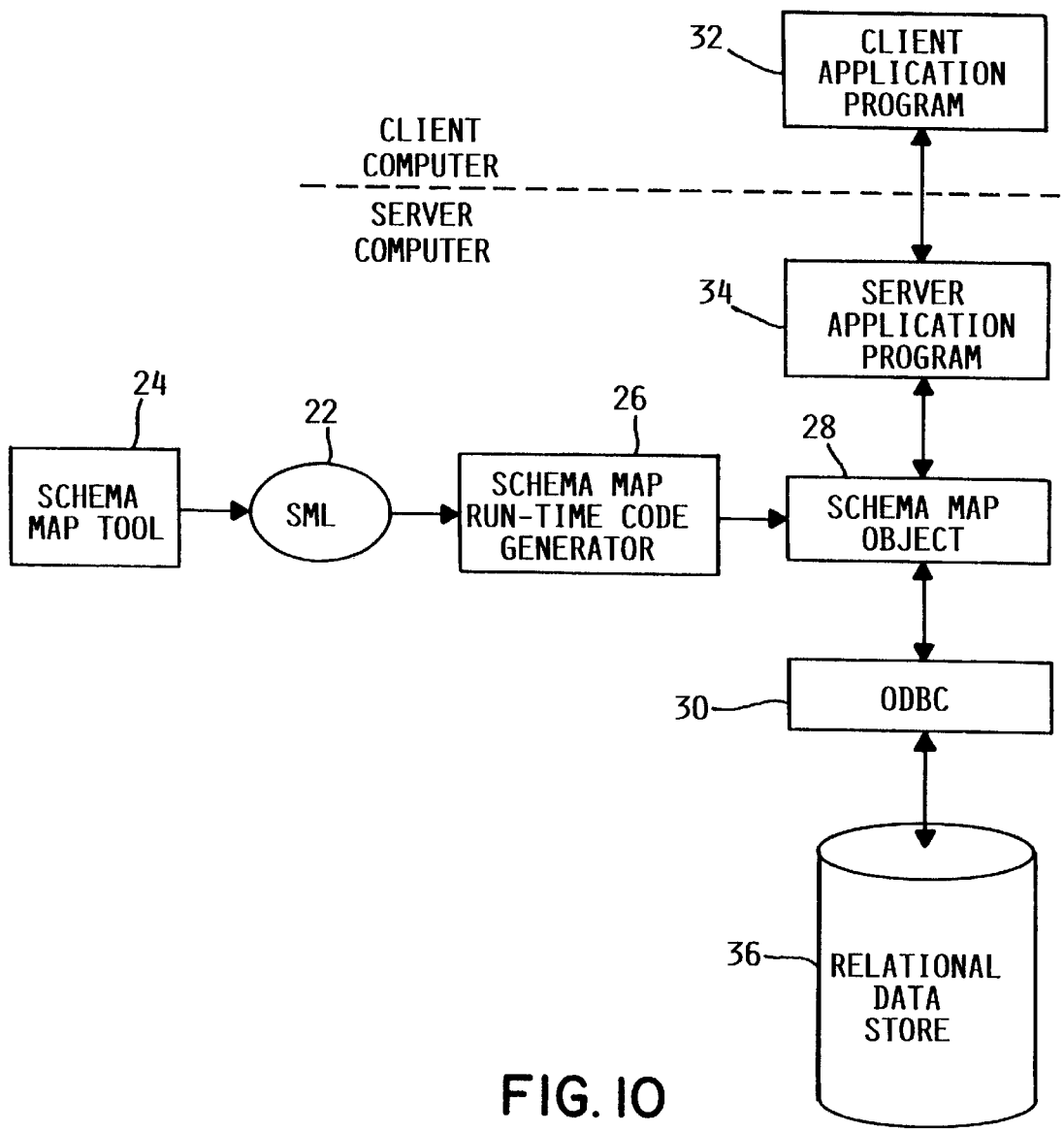
FIG. 10 illustrates the cooperation of the software elements of the system that perform the methods of the present invention.
Figure 11:
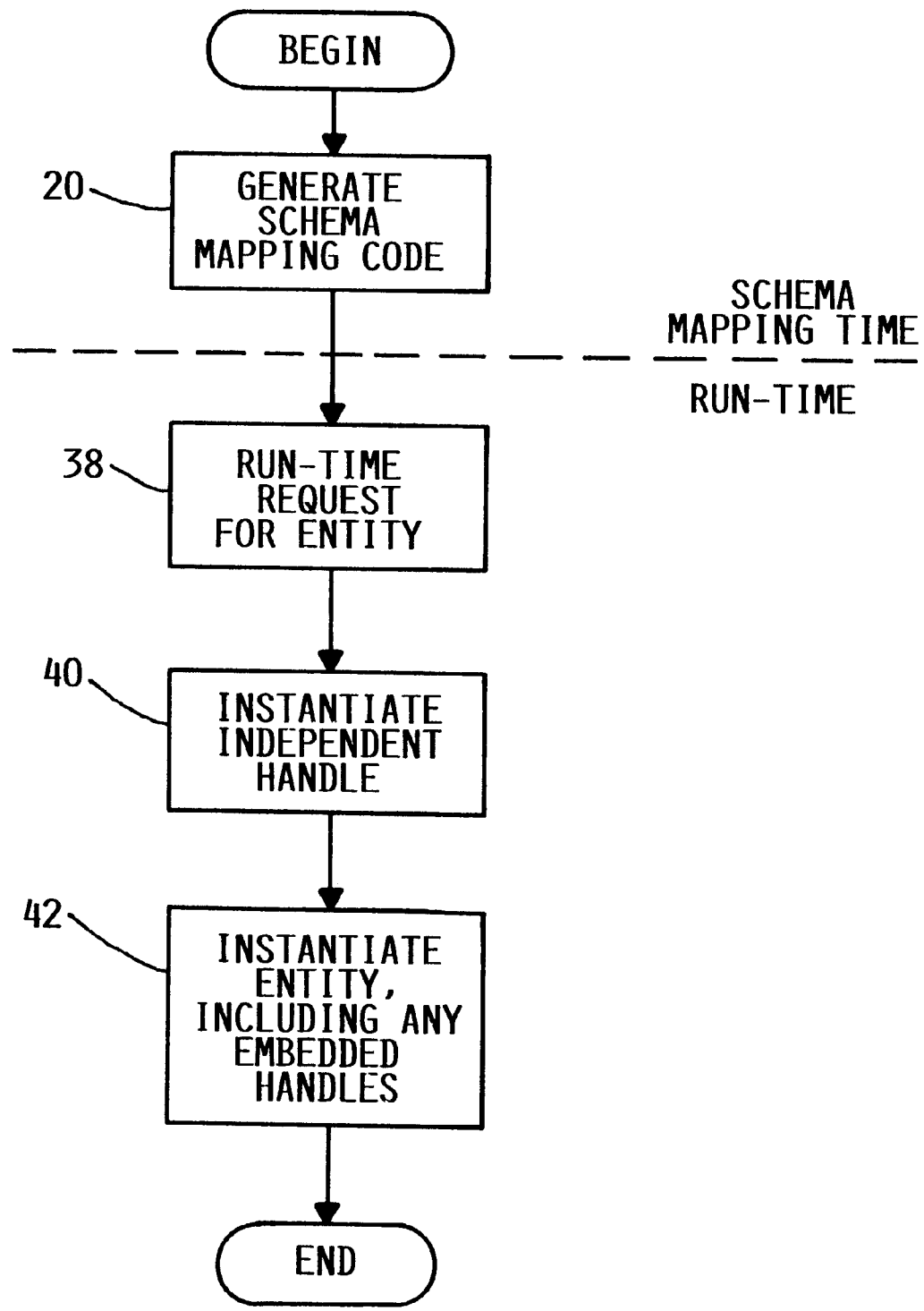
FIG. 11 is a flow diagram illustrating the method by which schema mapping occurs prior to run-time, and an object and its independent and embedded handles are instantiated at application program run-time.
Figure 12:
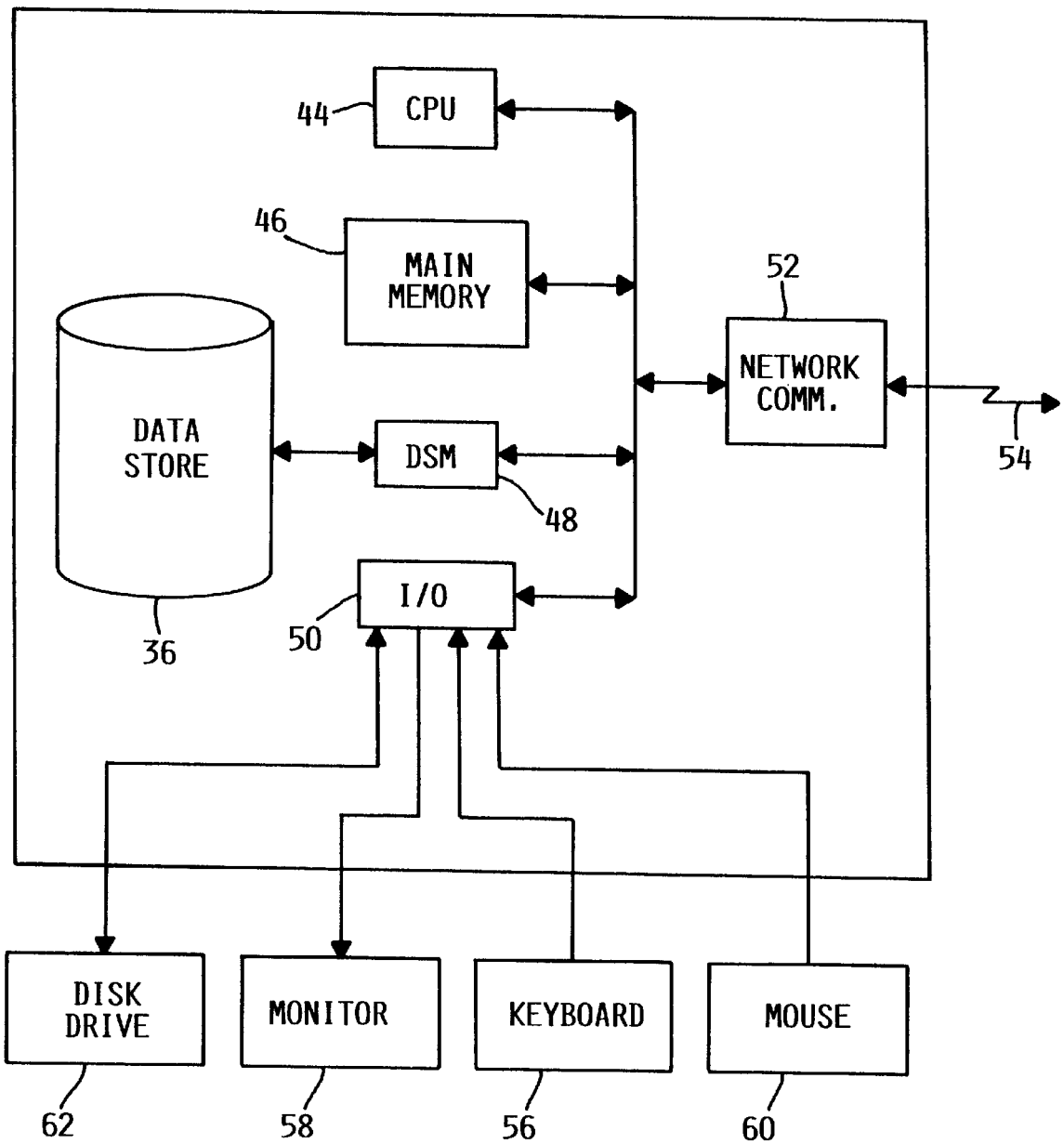
FIG. 12 illustrates a programmed computer system for performing the methods of the present invention.

Referring first to FIGS. 10–12, one aspect of the invention relates to events that occur prior to the time an application program is run, which is referred to as schema mapping time, and another aspect of the invention relates to events that occur at application program run-time. As illustrated by step 20 in FIG. 11, at schema mapping time the user generates schema mapping language (SML) 22 (FIG. 10) that defines the mapping. SML 22 may be generated manually or with the aid of a schema mapper tool 24 (FIG. 10). SML 22 is written in a high-level language, the relevant syntax of which is described in the above-referenced related U.S. patent application Ser. No. 08/883,838, filed Jun. 26, 1997, entitled "DEPENDENT PERSISTENCE," and Ser. No. 08/912,020, filed Aug. 15, 1997, entitled "LEGACY SUBCLASSING," which are incorporated herein by reference. Mapping between object schema and relational schema is also described in, for example, U.S. Pat. No. 5,629,979, titled "A SYSTEM AND METHOD FOR PROVIDING A GRAPHICAL USER INTERFACE FOR MAPPING AND ACCESSING OBJECTS IN DATA STORES," (IBM Docket ST9-94-017) incorporated herein by reference. Because such mapping systems are known, the full capabilities and features of schema map tool 24 and the SML 22 it generates are not discussed in the present specification. It is sufficient to note that schema map tool 22 and SML 24 performs mapping as described generally above and as described below with respect to specific cases and examples. Schema map tool 24 and SML 22 may have any other suitable features, such as those described in the above-referenced patent specifications. Although schema map tool 24 and SML 22 may have such features, for purposes of clarity the description in the present specification focuses on those features that relate to the mapping methods of the present invention.

Referring to FIG. 10, a schema map run-time code generator 26 parses SML 22 and links or connects it with the entities defined in an application program to produce executable or run-time mapping code. The run-time mapping code is stored in a schema map object 28 and interfaces to an open database connectivity (ODBC) driver/manager 30. The ODBC system, developed by Microsoft Corporation of Redmond, Wash. is a system that interfaces application programs and relational databases. The Java™ database connectivity (JDBC™) driver, developed by Sun Microsystems of Mountain View, Calif., is similar and is intended to be used in a Java™ environment. ODBC and JDBC include a driver manager and driver components. ODBC and JDBC are call-level interfaces, meaning that they consist of a set of function calls in a high-level application programming language, such as C, C++ or Java. A driver implements an application program interface (API) that supports a particular database system. An application program may call ODBC or JDBC functions to store, retrieve or delete data. In response to these calls, the driver generates SQL statements that are suited to the particular database management system. Because those persons skilled in the art of the present invention are ordinarily familiar with ODBC and JDBC, further details regarding their architecture and use are not provided in this patent specification. Background information that may be of interest to software developers may be found in, for example, Kyle Geiger, *Inside ODBC*, Microsoft Press, 1995.

Although the present invention may be embodied in a non-networked computing system, it is more preferably embodied in a client-server computing system. The application program is distributed between a server application program 32 and a client application program 34 in any suitable manner that is conventional in client-server computing. In a similar vein, although schema map tool 24 is illustrated as part of the server computer, a user may use schema map tool 24 remotely from any suitable computer networked to the server computer. Essentially, the functional elements of the present invention may be distributed among any suitable computing systems that are networked to one another.

The persistent states of the entities are stored in a relational data store or database 36. Returning to FIG. 11, at run-time, the application program may request that an entity whose persistent state is stored in database 36 be restored, as indicated by step 38. In response to this request, an independent handle is instantiated, as indicated by step 40. This step includes retrieving from database 36 (FIG. 10) all of the data necessary to fill in the fields of the handle that define the entity's unique identity. The correspondence or mapping between the columns of the database from which the data are retrieved and the fields of the handle is defined by schema map object 28 (FIG. 10). With a handle thus instantiated, the entity itself may be instantiated, as indicated by step 42. Instantiating the entity includes instantiating all of its fields, including any embedded handles. Therefore, this step includes retrieving from database 36 all of the data necessary to fill in the fields of any embedded handles that define the unique identities of the entities referenced by those embedded handles. The correspondence or mapping between the columns of the database from which the data are retrieved and the fields of an embedded handle is defined by schema map object 28.

A suitable server computer is illustrated in FIG. 12 and may be programmed in any suitable manner that effects the functions described herein. The computer includes a central processing unit 44, a main memory 46, a data store manager 48, input/output (I/O) interfaces 50, and network communication interfaces 52. A network communication link 54 connects the computer to other computers, such as the client computer (not shown). A user may interact with schema map tool 24 via a keyboard 56, a monitor 58 and a mouse 60 A removable-media disk drive 62, such as a floppy disk drive, is also provided, and may be used for, among other purposes, recording SML 22 or schema map object 28 (FIG. 3), or any of the other objects, software or data described below. Although data store 36 is illustrated as being integral to the server computer for purposes of clarity and convenience, it may be remotely located and accessed via network communication link 54. Similarly, SML 22, schema map object 38 or any of the other objects, software or data may be transmitted to or received from remote computers via network communication link 54.

There may be several ways to map an entity and its associated handle. Any mapping consists of defining a correspondence between fields represented by instance variables of a handle class and columns of the database table. The optimal method may depend on, for example, whether the associated handle is independent or embedded, whether the table has a primary key or foreign key defined, any constraints imposed by the existence of a key object, and whether the instance variables of the handle correspond (in meaning) to any instance variables of the entity. FIGS. 1–5 illustrate several methods for optimizing mapping an independent handle in response to these conditions. FIGS. 6–9 illustrate several corresponding methods for mapping an embedded handle. The examples relate to an employee database, in which each employee has attributes that include a first name, a last name, an employee number, a Social Security number, and an address. The address has attributes that include a street, a city and a state.

As illustrated in FIG. 1, an entity 64 has fields represented by instance variables "ivFirstName", which is of type "String", "ivLastName", which is of type "String", and "ivEmployeeNbr", which is of type "Int". An independent handle 66 references entity 64, as indicated by the arrow. It is the user's task to schema map handle 66 to a relational database table 68. Table 68 is a legacy or preexisting table and thus does not necessarily have optimal column definitions for persisting entity 64. Conversely, the application program in which entity 64 is defined was not necessarily written to take advantage of column definitions of table 68. Thus, schema mapping may not be straightforward. Table 68 has three columns, named "FirstName", "LastName", and "EmpNum", representing the employee's first name, last name and employee number, respectively. Columns "LastName" and "EmpNum" in combination are pre-defined as the primary key.

Like any handle, handle 66 may have a number of fields, as represented by "<FIELDS>" and the ellipsis (" . . . "), and this symbology is used throughout these examples. These fields may include information about entity 64 that is defined by the framework, such as class information. For purposes of describing the present invention, only one field of a handle, the object identifier field, is relevant. The object identifier field is the unique identity of the referenced entity within a given table. Although this field could be represented by an instance variable having some unique value, as in the case of a UUID, in the present invention a dependent object provides the unique identity. The object identifier field is used only as a reference to the dependent. In this example, the reference in handle 66 is represented by instance variable "ivDEmpKey", which is of type "Dependent". It references a dependent that is referred to in this specification as a key object.

A programmer other than the user, such as a database or framework administrator, may define the class of which the key object is an instance. The programmer defines a key object class for each handle class that is believed to be needed to reference the entities used in the application programs running on the framework. The programmer defines the class to have a group of fields represented by instance variables that the programmer believes are likely candidates for a user to later select as the unique identity for a handle. The programmer may include instance variables that are defined in the entity class that are potentially useful to uniquely identify the entity, either by themselves or in combination with one another. In addition, or alternatively, the programmer may include instance variables that are not defined in the entity class but that are intended to correspond to columns of the table. The key object class definitions that the programmer creates are provided to the user as a software package that the user may use in any suitable manner, but that the user cannot modify directly. In embodiments of the present invention in which key objects are included, the user must take them into account in developing a mapping.

The key object 70 in this example may include a number of fields, each represented by an instance variable. To map a handle, the user, preferably assisted by schema map tool 24 (FIG. 10), selects a group of one or more of these instance variables. Schema map tool 24 may present these instance variables to the user via a graphical user interface (GUI) and request the user to make a selection. In the illustrated example, the user is presented with "ivLastName", which is of type "String", and "ivEmployeeNbr", which is of type "Int". Schema map tool 24 may request that the user enter the table definition, including the table name and column names. In this example, by the programmer's foresight or otherwise, two of the instance variables with which the user is presented in the key object class, "ivEmployeeNbr" and "ivLastName", also exist in the entity class and, furthermore, correspond to the two columns defined as the primary key. In this case, the user selects these two instance variables from the key object class, and maps "ivEmployeeNbr" to the "EmpNum" column and "ivLastName" to the "LastName" column. In response to this input, schema map tool 24 generates SML 22 reflecting this mapping. The following is an SML listing representative of the above example:

```
CLASS Package.Employee
    PRIMARYKEY Package.DEmpKey
        PRIMARY_KEYFIELD ivEmployeeNbr int COLUMN Employee.EmpNum INTEGER NOTNULL
        PRIMARY_KEYFIELD ivLastName String COLUMN Employee.LastName VARCHAR (20) EXTERNAL
NOTNULL
    END_PRIMARYKEY
    FIELD ivFirstName String COLUMN Employee.FirstName VARCHAR (20) EXTERNAL
    FIELD ivLastName String COLUMN Employee.LastName VARCHAR (20) EXTERNAL
    FIELD ivEmployeeNbr int COLUMN Employee.EmpNum INTEGER NOTNULL
END_CLASS
```

Run-time code generator 26 processes the above-listed SML to generate a schema map object 28 that reflects the mapping. In response to a run-time request to instantiate or restore entity 66, a request is generated to instantiate independent handle 66. In response to that request, schema map object 28 instantiates key object 70 and initiates the retrieval of values from the columns of table 68 to which the instance variables of key object 70 are mapped. The instance variables of key object 70 are set to the retrieved values, with any necessary conversion of data types.

Figure 2:
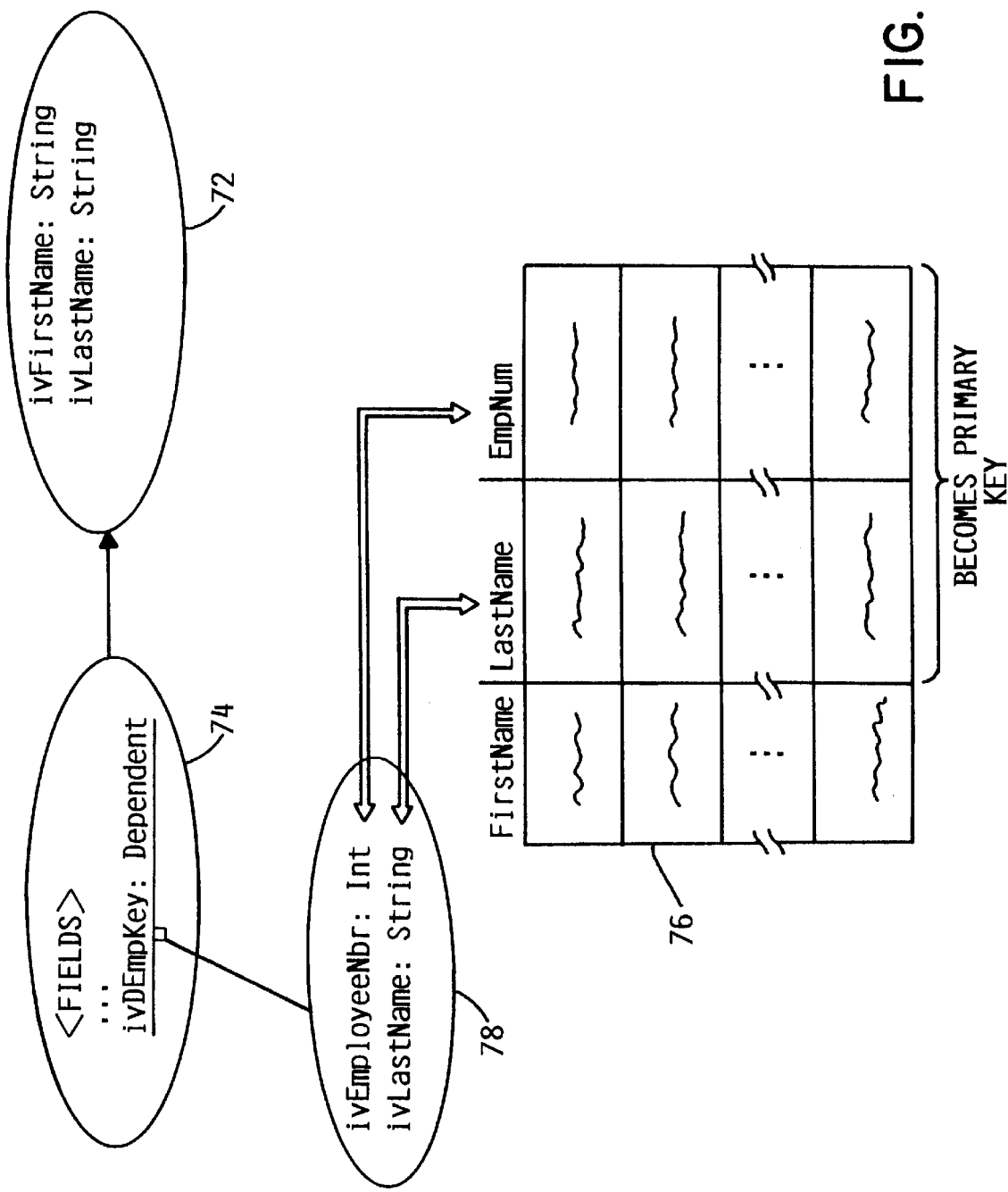
FIG. 2 is an object and database table diagram illustrating a method in which fields of an independent key object are mapped to columns of the table that are added to the legacy columns.

As illustrated in FIG. 2, an entity 72 has fields represented by instance variables "ivFirstName", which is of type "String", and "ivLastName", which is of type "String". An independent handle 74 references entity 72. Table 76 is a legacy or pre-existing table to which handle 74 is to be mapped. Table 76 has two columns, named "FirstName" and "LastName". In contrast to the example described above, the mapping is not straightforward because the table does not have a pre-defined primary key.

As in the example described above, the object identifier field of handle 74 references a dependent. This dependent is key object 78, which is an instance of a class pre-defined by a programmer as described above. As in the example described above, the user is presented with the key object class instance variables "ivLastName", which is of type "String", and "ivEmployeeNbr", which is of type "Int". As in all of the examples described in this specification, schema map tool 24 may request that the user enter the table definition, including the table name and column names.

In contrast to the example described above, in this example there is no pre-defined primary key to which the user can map the fields of handle 74. A solution to this problem is to add a column to table 76 that, by itself or in combination with an existing column, defines a primary key, i.e., can be used to uniquely identify each row of table 76. A column may be added to a legacy table in any suitable manner, such as by providing the application program with an application program interface (API) (not shown) to communicate with another application program (not shown) that maintains the legacy database tables. For example, the other application program may be whatever legacy (procedural) application program formerly used the database before the integration of the object-oriented application program. In conjunction with a store operation in which the object-oriented application program stores a new employee entity 72 in the database, it may request a corresponding employee number for that employee from the legacy application program and set "ivEmployeeNbr" in handle 78 to that value.

In this example, the user recognizes that one of the instance variables with which he is presented in the key object class, "ivLastName", also exists in the entity class and, furthermore, corresponds to the "LastName" column of table 76. Thus, by adding a column "EmpNum" (as indicated in dashed line), the columns "LastName" and "EmpNum" in combination can be defined as the primary key. The user selects these two instance variables from the key object class, and maps "ivLastName" to the "LastName" column and "ivEmployeeNbr" to the newly added "EmpNum" column. In response to this input, schema map tool 24 generates the following SML 22 reflecting this mapping. SML 22 is identical to that described above with respect to FIG. I because, following the addition of the "EmpNum" column, the table is identical to that of FIG. 1 and the mapping is identical to that described above with respect to FIG. 1.

As in the example described above, run-time code generator 26 processes the above-listed SML to generate a schema map object 28 that reflects the mapping. In response to a run-time request to instantiate or restore entity 72, a request is generated to instantiate independent handle 74 In response to that request, schema map object 28 instantiates key object 78 and initiates the retrieval of values from the columns of table 76 to which the instance variables of key object 78 are mapped. The instance variables of key object 78 are set to the retrieved values, with any necessary conversion of data types.

Figure 3:
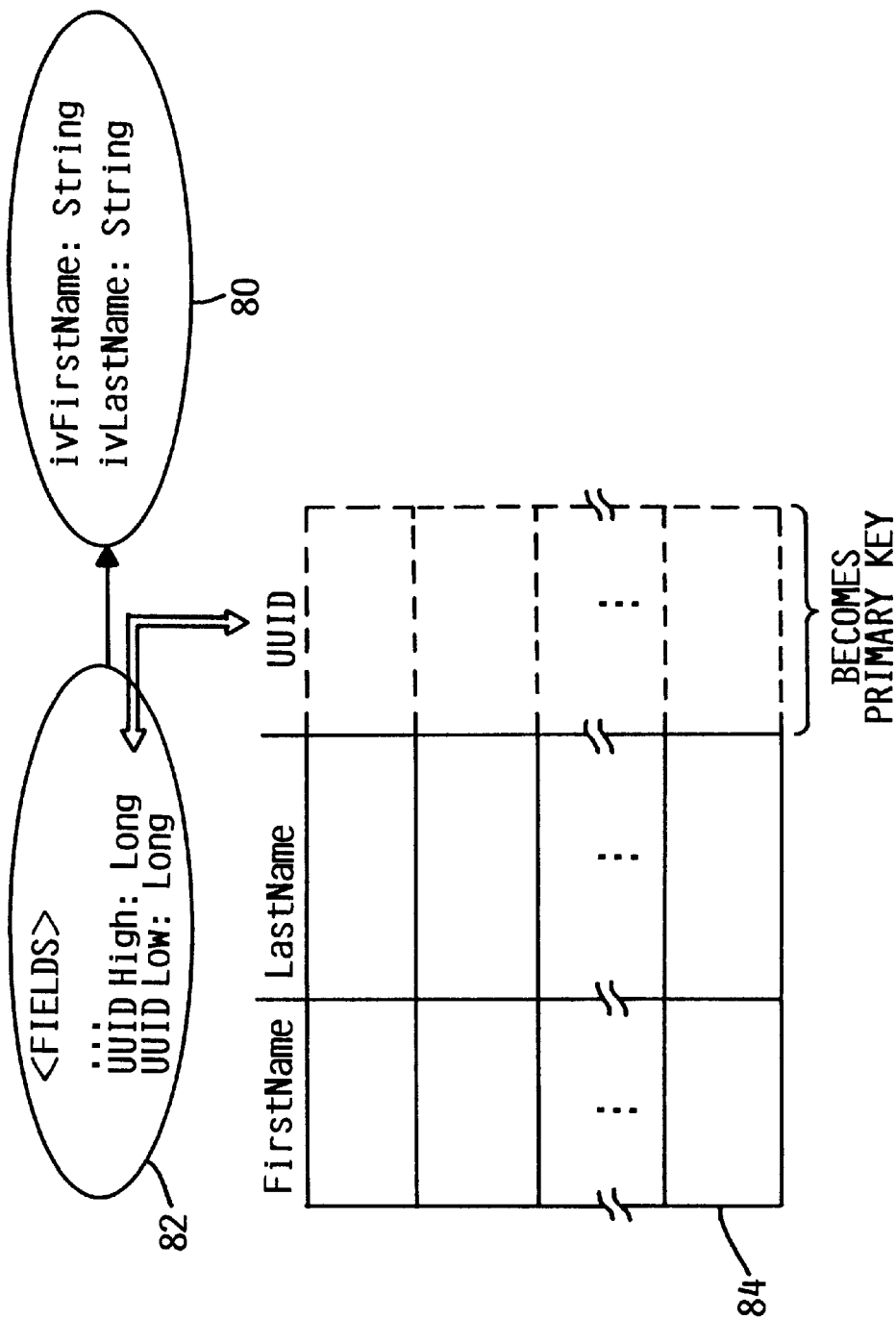
FIG. 3 is similar to FIG. 2, but the added column represents a universally unique identifier (UUID)

A variation of the example described above with respect to FIG. 2 is illustrated in FIG. 3. In this example, an entity 80 has the same fields as in that example. An independent handle 82 references entity 80. Table 84 is a legacy table having the same initial or legacy column definitions as in the example described above and does not have a pre-defined primary key.

In this example, handle 82 has an object identifier field that is defined as a system-generated UUID. (The example illustrates a UUID as comprising two words of type "Long", but any UUID convention would be suitable.) In other words, when an entity is created, the system generates a unique identity represented by a UUID. The method that constructs the handle simply stores the UUID in the object identifier field. To facilitate restoration of the handle, a column "UUID" is added to table 84. By definition, UUID is the unique identity of an entity. Thus, this new column can be defined as the primary key of table 84. The new column may be added in any suitable manner, such as by providing an API. The following is SML 22 for this example:

```
CLASS Package.Employee
    PRIMARYKEY Package.DEmpKey
        PRIMARY_KEYFIELD *OBJECTID COLUMN Employee.UUID BINARY (16) NOTNULL
    END_PRIMARYKEY
    FIELD ivFirstName String COLUMN Employee.FirstName VARCHAR (20) EXTERNAL
    FIELD ivLastName String COLUMN Employee.LastName VARCHAR (20) EXTERNAL
END_CLASS
```

Figure 4:
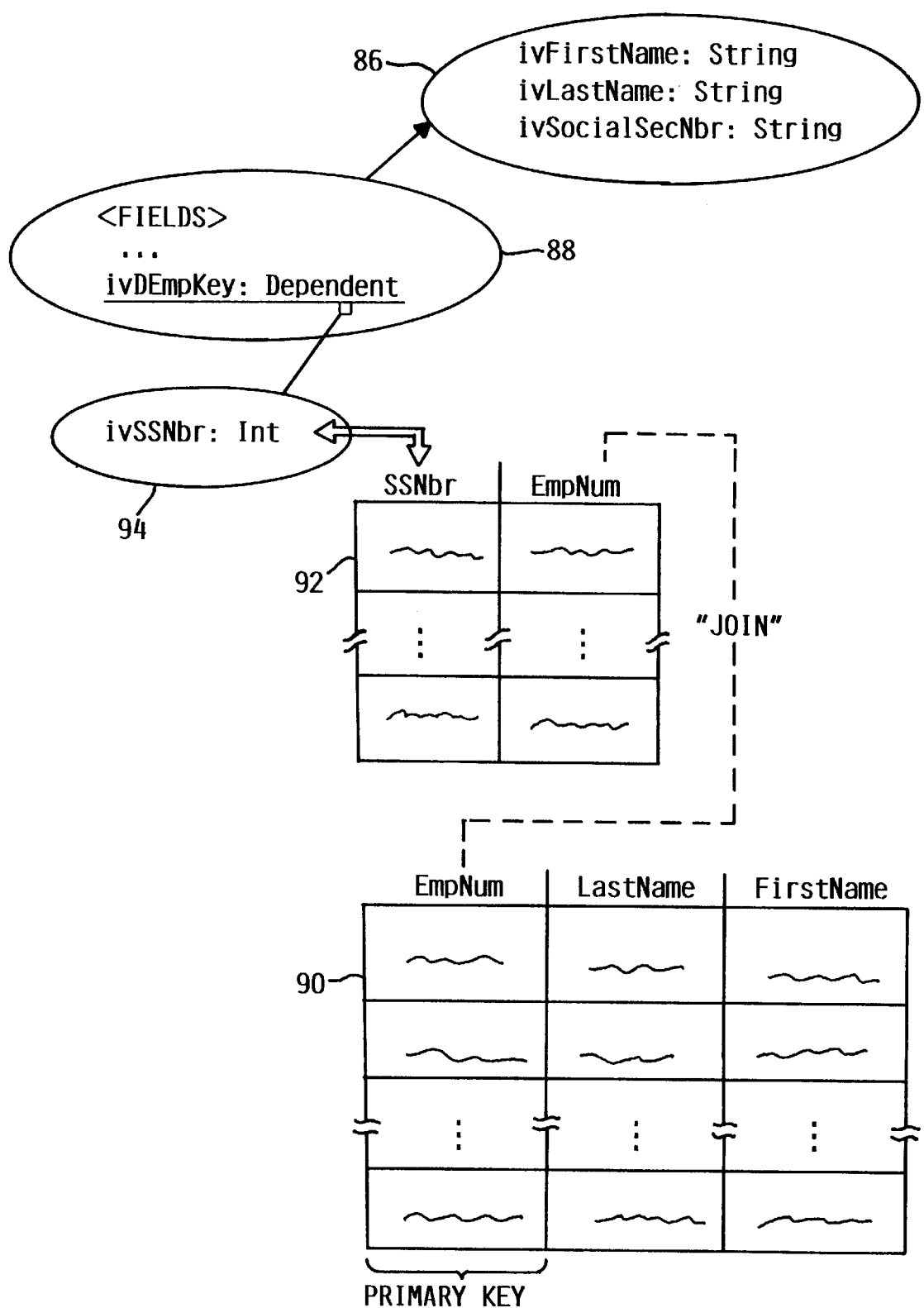
FIG. 4 is an object and database table diagram illustrating a method in which fields of an independent key object are mapped to columns of a sidetable that is joined to the table via a foreign key relationship.

As illustrated in FIG. 4, an entity 86 has fields represented by instance variables "ivFirstName", which is of type "String", "ivLastName", which is of type "String", and "ivSocialSecNbr", which is of type "String". An independent handle 88 references entity 86. Table 90 is a legacy or pre-existing table to which handle 88 is to be mapped. Table 90 has three columns, named "EmpNum", "LastName" and "FirstName". Column "EmpNum" is pre-defined as a primary key.

The object identifier field of handle 88 references a key object 94. A potential problem is that, although a primary key exists, it does not correspond to any of the instance variables of the entity class. In this example, "EmpNum" represents an employee number, but none of the fields of entity 86 is an employee number. As in the examples described above, the user is presented with the key object class instance variables. The user recognizes that one of them, "ivSSNbr", can be used as a unique identity for entity 86, since no two people in the United States have the same Social Security number. Nevertheless, none of the columns of table 90 represents a Social Security number.

A solution to this problem is to add a sidetable 92 having a column "ssNbr" defined as a primary key and having a column "EmpNum" defined as a foreign key into table 90. The foreign key relationship is reflected in suitable statements in SML 22, which those skilled in the art will recognize as similar to the "JOIN" statement in SQL. A sidetable may be added to a legacy table in any suitable manner, such as by providing an API. Because sidetable 92 must be maintained, and entity 86 has no knowledge of employee numbers in conjunction with a store operation in which the object-oriented application program stores a new employee entity 86 in the database, the object-oriented application program may request via an API from the legacy application program that the "EmpNum" column in sidetable 92 be set properly. In addition, the legacy application program may be provided with an API to the object-oriented application program to allow it to obtain the Social Security number of any new employee it adds to the database.

By adding sidetable 92, the user may select the "ivssNbr" instance variable and map it to the "ssNbr" column of sidetable 92, which is defined as a primary key. The following is SML 22 for this example:

```
CLASS Package.Employee
   PRIMARYKEY Package.DAltEmpKey
      PRIMARY_KEYFIELD ivSSNbr String COLUMN Employee.SSNbr CHAR (9) NOTNULL EXTERNAL
   END_PRIMARYKEY
   FIELD ivFirstName String COLUMN Employee.FirstName VARCHAR (20) EXTERNAL
   FIELD ivLastName String COLUMN Employee.LastName VARCHAR (20) EXTERNAL
   FIELD ivEmployeeNbr int COLUMN Employee.EmpNum INTEGER NOT NULL
END_CLASS
``` to the example described above with respect to FIG. 1, the key object class does not present the user with any instance variables corresponding to instance variables in entity 96. The "ssNbr" instance variable may be considered to represent a "hidden field" because the application program has no knowledge of Social Security numbers.

A solution to this problem is to select "ivssNbr" and map it to the "ssNbr" column. The application program can be provided with an API to enable it to request a Social Security number from the legacy program when the application program stores entity 96. The following is SML 22 for this example:

```
CLASS Package.Employee
   PRIMARYKEY Package.DAltEmpKey
      PRIMARY_KEYFIELD ivSSNbr String COLUMN EmpSideTable.SSNbr CHAR (5) NOTNULL EXTERNAL
   END_PRIMARYKEY
   FIELD ivFirstName String COLUMN Employee.FirstName VARCHAR (20) EXTERNAL
   FIELD ivLastName String COLUMN Employee.LastName VARCHAR (20) EXTERNAL
   FIELD ivSocialSecNbr String COLUMN EmpSideTable.SSNbr INTEGER NOTNULL EXTERNAL
   RELATIONSHIP EmpSideTable COLUMN EmpNum JOINTABLE Employee JOINCOLUMN EmpNum JOINTYPE
INNER
END_CLASS
```

As in the examples described above, run-time code generator 26 processes the above-listed SML to generate a schema map object 28 that reflects the mapping. In response to a run-time request to instantiate or restore entity 86, a request is generated to instantiate independent handle 88 In response to that request, schema map object 28 instantiates the key object 94 and initiates the retrieval of values from the columns of table 92. The instance variables of key object 94 are set to the retrieved values, with any necessary conversion of data types.

Figure 5:
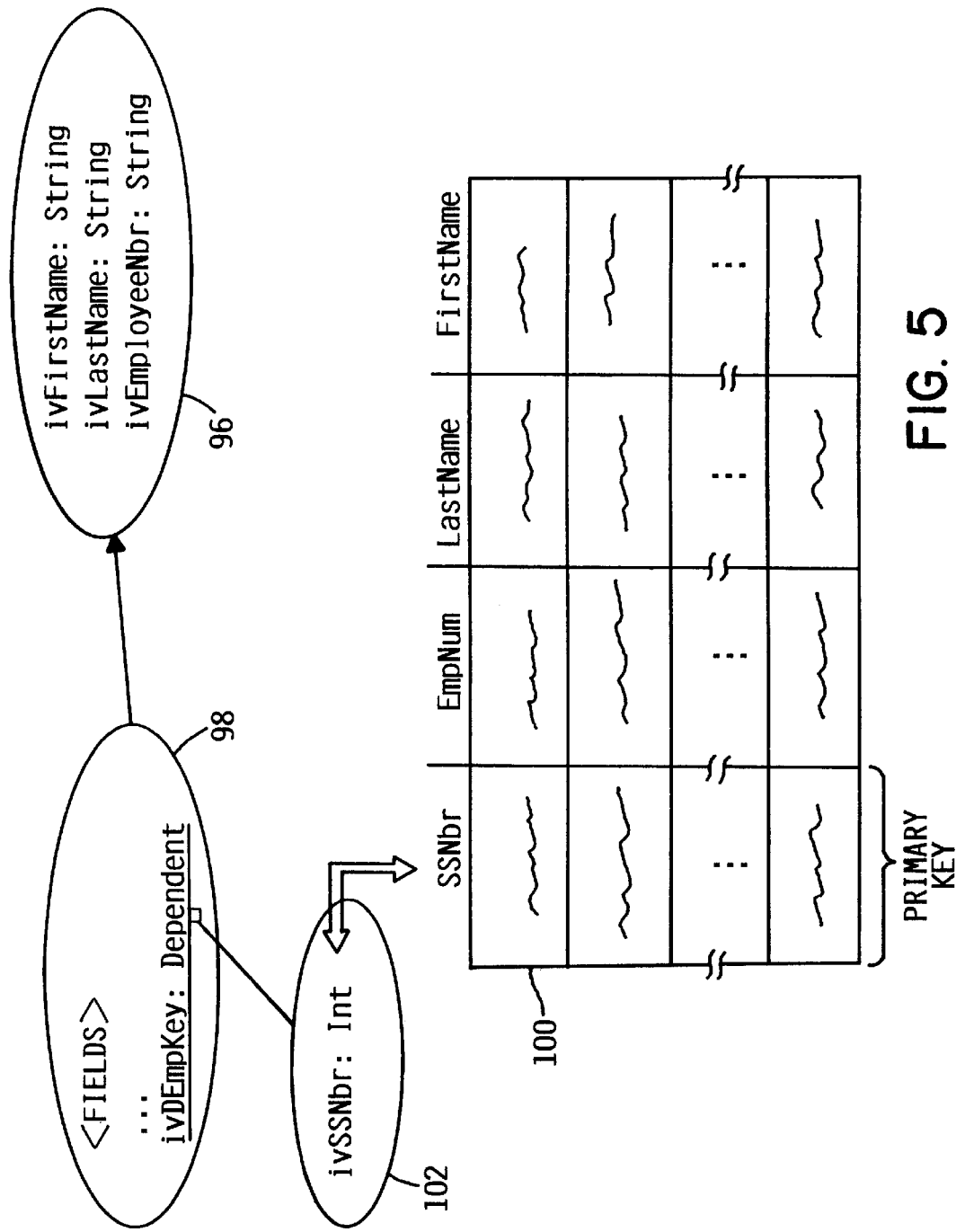
FIG. 5 is similar to FIG. 1, but the mapped field of the independent key is "hidden," i.e., it does not correspond to any instance variable in the object.

As illustrated in FIG. 5, an entity 96 has fields represented by instance variables "ivFirstName", which is of type "String", "ivLastName", which is of type "String", and "ivEmployeeNbr", which is of type "String". An independent handle 98 references entity 96. Table 100 is a legacy table having columns named "ssNbr", "EmpNum", "Last-Name" and "FirstName". The "ssNbr" column is predefined as a primary key.

The object identifier field of handle 98 references a key object 102. Although this scenario may at first seem similar The same methods described above for mapping independent handles may be used for mapping embedded handles.

Figure 6A:
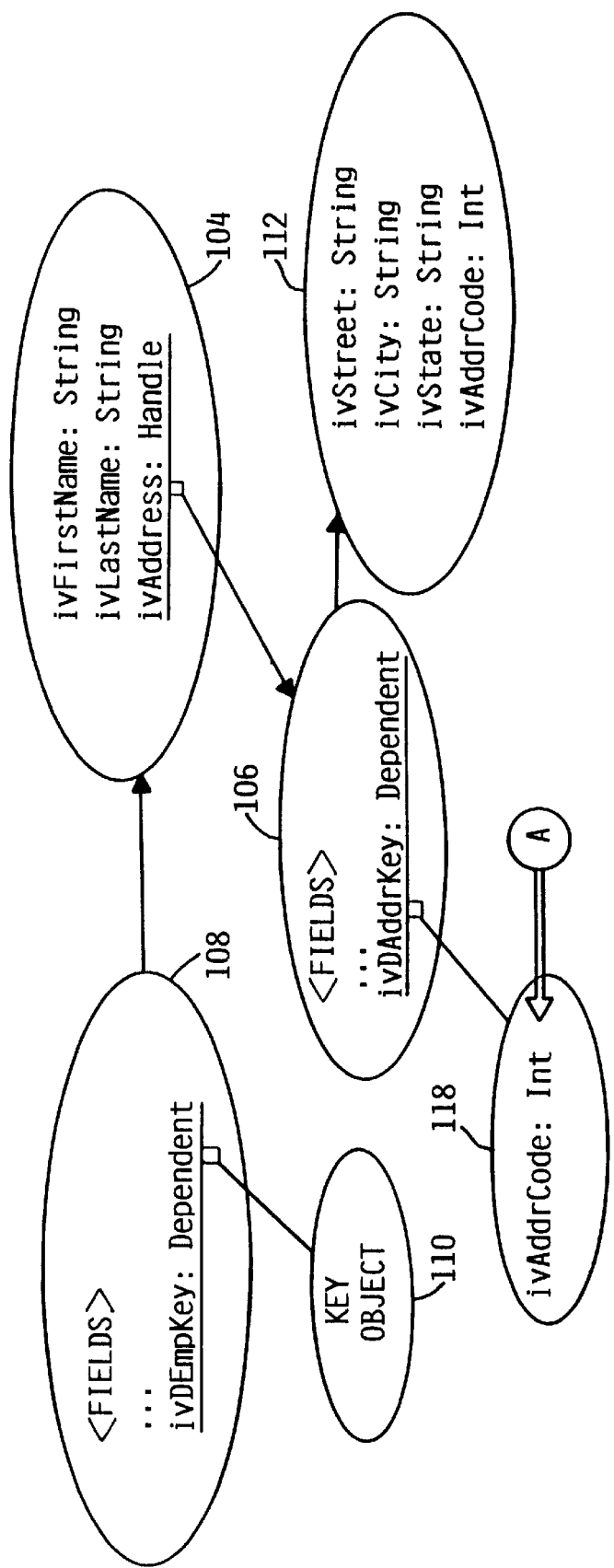
FIG. 6 is an object and database table diagram illustrating a method in which fields of an embedded key object is directly mapped to a foreign key column of the table.
Figure 6B:
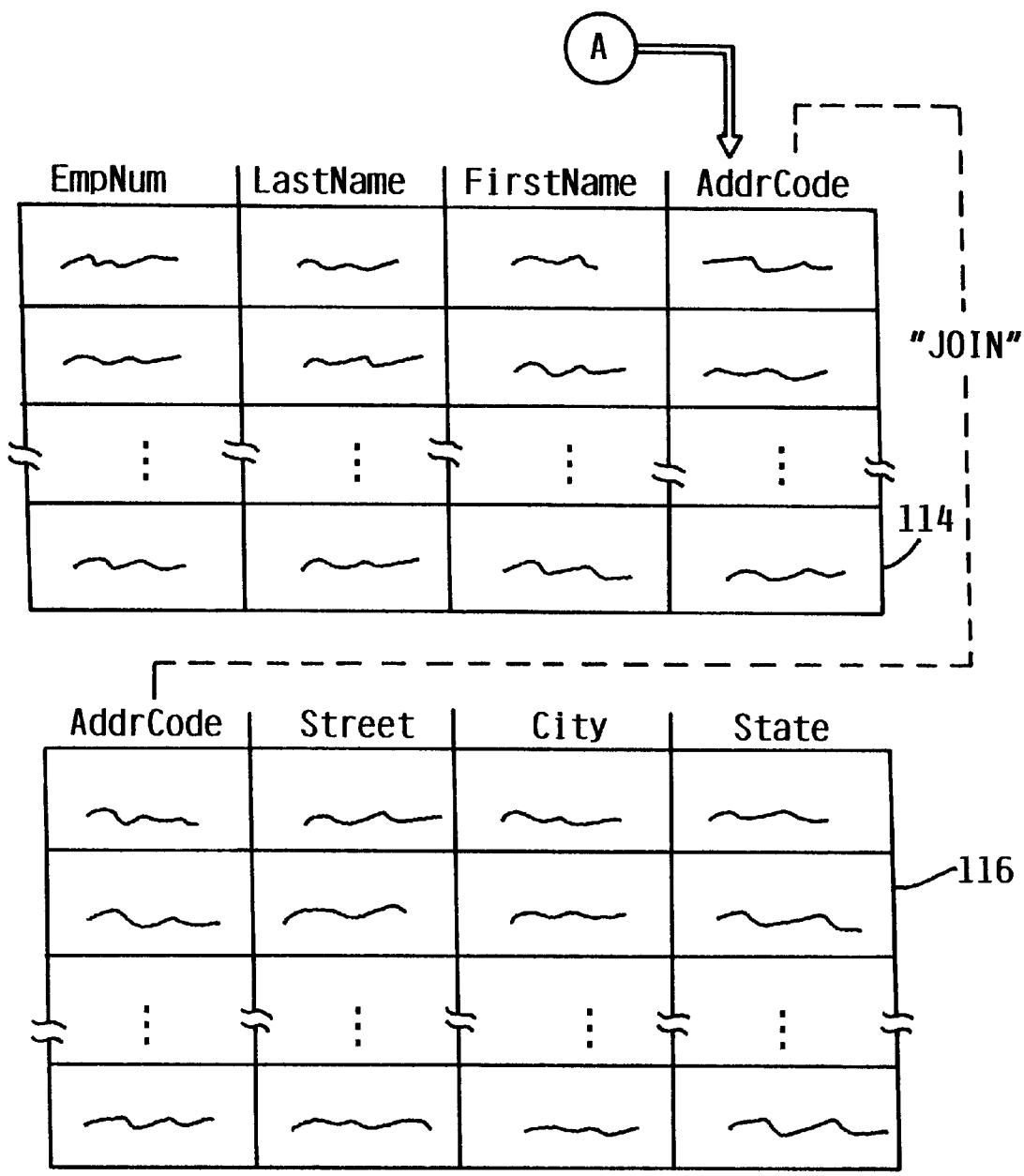

As illustrated in FIG. 6, an entity 104 has fields represented by instance variables "ivFirstName", which is of type "String", "ivLastName", which is of type "String", and "ivAddress", which is of type "Handle". "Handle" is not a conventional type in Java™ or other languages, but rather is a class defined in the framework of the present invention to indicate an embedded handle. A field of class "Handle" references an embedded handle 106. An independent handle 108 references entity 104 and has a key object 110 as in the examples described above. Nevertheless, independent handle 108 is not relevant to this example, which relates to mapping embedded handle 106. Embedded handle 106 references an address entity 112, which has fields represented by the instance variables "ivStreet", which is of type "String", "ivCity", which is of type "String", "ivState", which is of type "String", and "ivAddrCode", which is of type "Int".

The legacy database includes an employee table 114 and an address table 116. Table 114 has four columns, named "EmpNum", "LastName", "FirstName", and "AddrCode", representing the employee's employee number, last name, first name, and an address code. Table 116 has four columns, named "AddrCode", "Street", "City" and "State". The "AddrCode" column of table 114 is defined via an SQL "JOIN" as a foreign key into the "AddrCode" column of table 116, which is defined as a primary key, as indicated in dashed line.

As in the independent key examples described above, the object identifier field of embedded key 106 is used only as a reference to a dependent. In this example, the reference in handle 106 is represented by instance variable "ivDAddrKey", which is of type "Dependent". It references a key object 118.

One of the instance variables with which the user is presented in the key object class, "ivAddrCode", also exists in address entity 112 and, furthermore, corresponds to the "AddrCode" column of table 114, which is defined as a foreign key. An embedded handle in object schema is analogous to a foreign key in a relational schema. (Just as an independent handle in object schema is analogous to a primary key in relational schema.) Therefore, the user may select "ivAddrCode" from the key object class and directly map it to the "AddrCode" column of table 114. The mapping of embedded handle 106 is analogous to the mapping of independent handle 66 in FIG. 1. The following SML 22 reflects this mapping:

examples described above. As in the example described above with respect to FIG. 6, independent handle 124 is not relevant to this example. Embedded handle 122 references an address entity 128, which has fields represented by the same instance variables as in that example. The legacy database includes an employee table 130 and an address table 132. Although not indicated in FIG. 7, the "AddrCode" column of table 130 may be defined as a foreign key into the "AddrCode" column of table 132, which is defined as a primary key.

The object identifier field of handle 122 references a key object 134. In this example, the key object class does not present with the user with an instance variable that corresponds to a foreign key of table 130. The reason is unimportant for purposes of describing this example. It may be,

```
CLASS Package.Employee
   PRIMARYKEY Package.DEmpKey
      PRIMARY_KEFIELD ivEmployeeNbr int COLUMN Employee.EmpNum INTEGER NOTNULL
      PRIMARY_KEYFILED ivLastName String COLUMN Employee.LastName VARCHAR (20) EXTERNAL
NOTNULL
   END_PRIMARYKEY
   FIELD ivFirstName String COLUMN Employee.FirstName VARCHAR (20) EXTERNAL
   FIELD ivLastName String COLUMN Employee.LastName VARCHAR (20) EXTERNAL
   FIELD ivEmployeeNbr int COLUMN Employee.EmpNum INTEGER NOTNULL
   HANDLE ivAddress Package.Handle
      TLS_USER_DEFINED_HANDLE Package.DAddrKeyObject
         CONTAINERID *SAME
         CLASSID ISCONSTANT 'Package.Address'
         FIELD ivAddrCode int COLUMN Employee.AddrCode INTEGER NOTNULL
      END_TLS_USER_DEFINED_HANDLE
   END_HANDLE
END_CLASS
CLASS Package.Address
   PRIMARYKEY Package.DAddrKeyObject
      PRIMARYKEY_KEYFIELD ivAddrCode int COLUMN Address.AddrCode INTEGER NOTNULL
   END_PRIMARYKEY
   FIELD ivAddrCode int COLUMN AddrCode INTEGER NOTNULL
   FIELD ivStreet String COLUMN Street VARCHAR (30) EXTERNAL
   FIELD ivCity COLUMN City VARCHAR (15) EXTERNAL
   FIELD ivState COLUMN State CHAR (2) EXTERNAL
END_CLASS
```

Run-time code generator 26 processes the above-listed SML to generate a schema map object 28 that reflects the mapping. When entity 104 is restored in response to a run-time request, a request is generated to instantiate embedded handle 106. In response to that request, schema map object 28 instantiates key object 118 and initiates the retrieval of a value from the "AddrCode" column of table 114 to which the selected instance variable of key object 118 is mapped. The instance variable of key object 118 is set to the retrieved value, with any necessary conversion of data types.

Figure 7A:
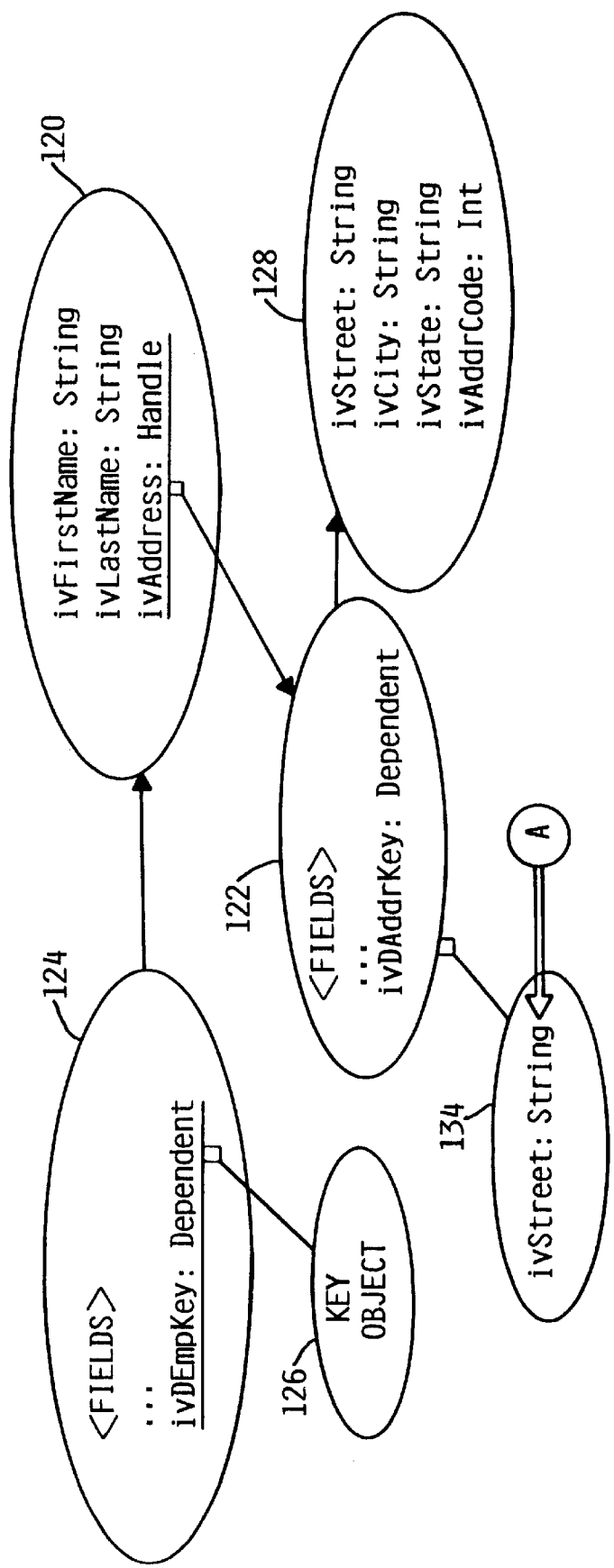
FIG. 7 is an object and database table diagram illustrating a method in which fields of an embedded key object are mapped to columns of the table that are added to the legacy columns.
Figure 7B:
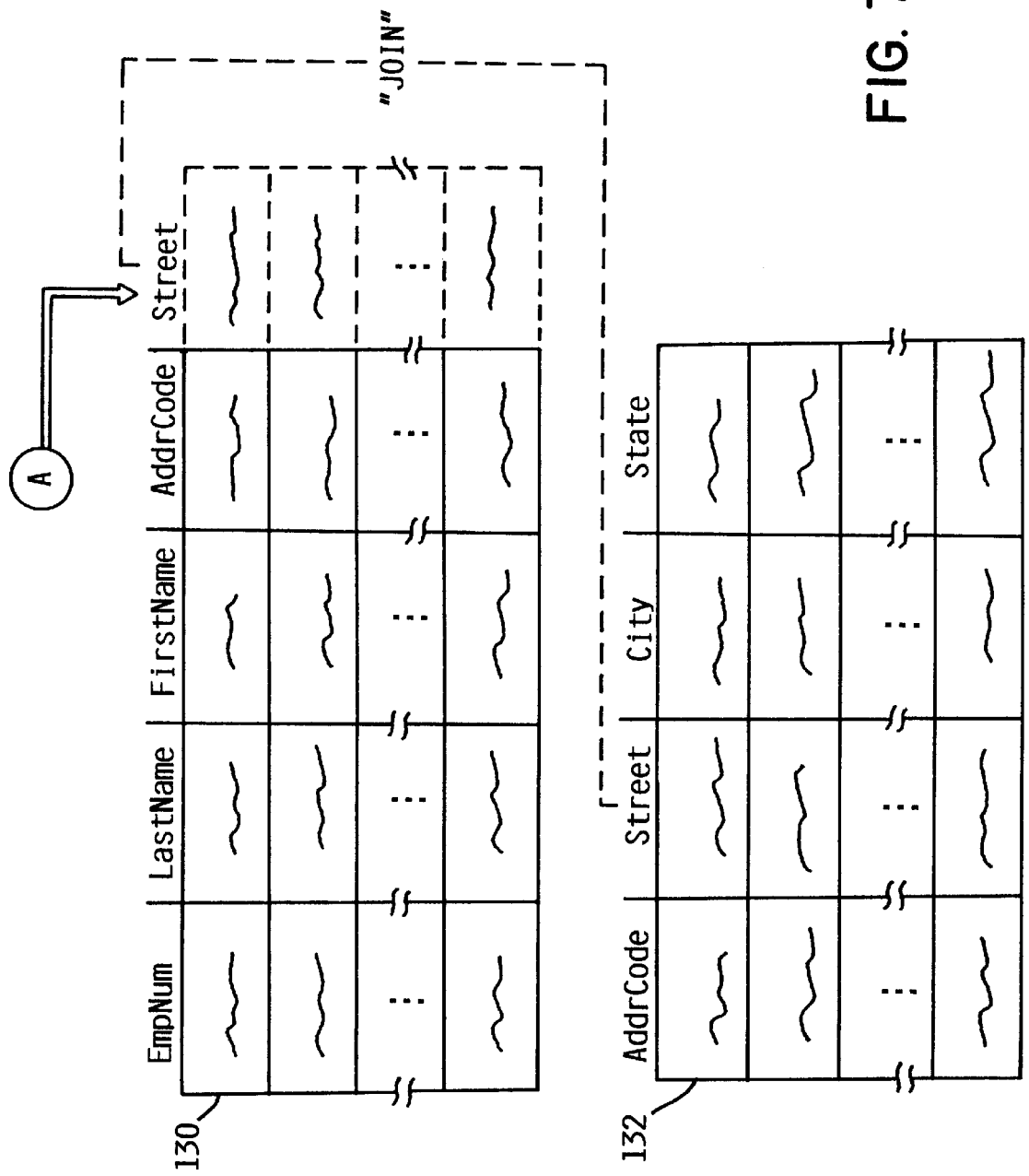

As illustrated in FIG. 7, an entity 120 has fields represented by the same instance variables as described above with respect to FIG. 6. A field of class "Handle" references an embedded handle 122. An independent handle 124 references entity 120 and has a key object 126 as in the for example, that the programmer did not anticipate that address codes would be used to link between tables. The key object class does provide an instance variable "ivStreet", which is of type "String". For purposes of this example, a street address is assumed to provide a unique identity for address entity 128. In other words, it could be mapped to a foreign key. The solution to the problem is to add a column to table 130 that, by itself or in combination with an existing column, defines a foreign key, i.e., can be used to uniquely identify each row of table 132 through the foreign key relationship. A "Street" column may be added to table 130 in the manner described above with respect to FIG. 2 and linked to table 132 via a "JOIN", as indicated in dashed line. The user thus may map "ivStreet" to the added "Street" column of table 76. The following SML 22 reflects this mapping:

```
CLASS Package.Employee
   PRIMARYKEY Package.DEmpKey
      PRIMARY_KEYFIELD ivEmployeeNbr int COLUMN Employee.EmpNum INTEGER NOTNULL
      PRIMARY_KEYFIELD ivLastName String COLUMN Employee.LastName VARCHAR (20) EXTERNAL
NOTNULL
   END_PRIMARYKEY
   FIELD ivFirstName String COLUMN Employee.FirstName VARCHAR (20) EXTERNAL
   FIELD ivLastName String COLUMN Employee.LastName VARCHAR (20) EXTERNAL
```

-continued

```
      FIELD ivEmployeeNbr int COLUMN Employee.EmpNum INTEGER NOTNULL
      HANDLE ivAddress Package.Handle
         TLS_USER_DEFINED_HANDLE Package.DaltAddrKey
            CONTAINERID *SAME
            CLASSID ISCONSTANT 'Package.Address'
            FIELD ivStreet String COLUMN Employee.Street VARCHAR (20) NOTNULL
         END_TLS_USER_DEFINED_HANDLE
      END_HANDLE
END_CLASS
```

Run-time code generator 26 processes the above-listed SML to generate a schema map object 28 that reflects the mapping. When entity 120 is restored in response to a run-time request, a request is generated to instantiate embedded handle 122. In response to that request, schema map object 28 instantiates key object 134 and initiates the retrieval of a value from the "Street" column of table 130 to which the selected instance variable of key object 134 is mapped. The instance variable of key object 134 is set to the retrieved value, with any necessary conversion of data types.

Figure 8A:
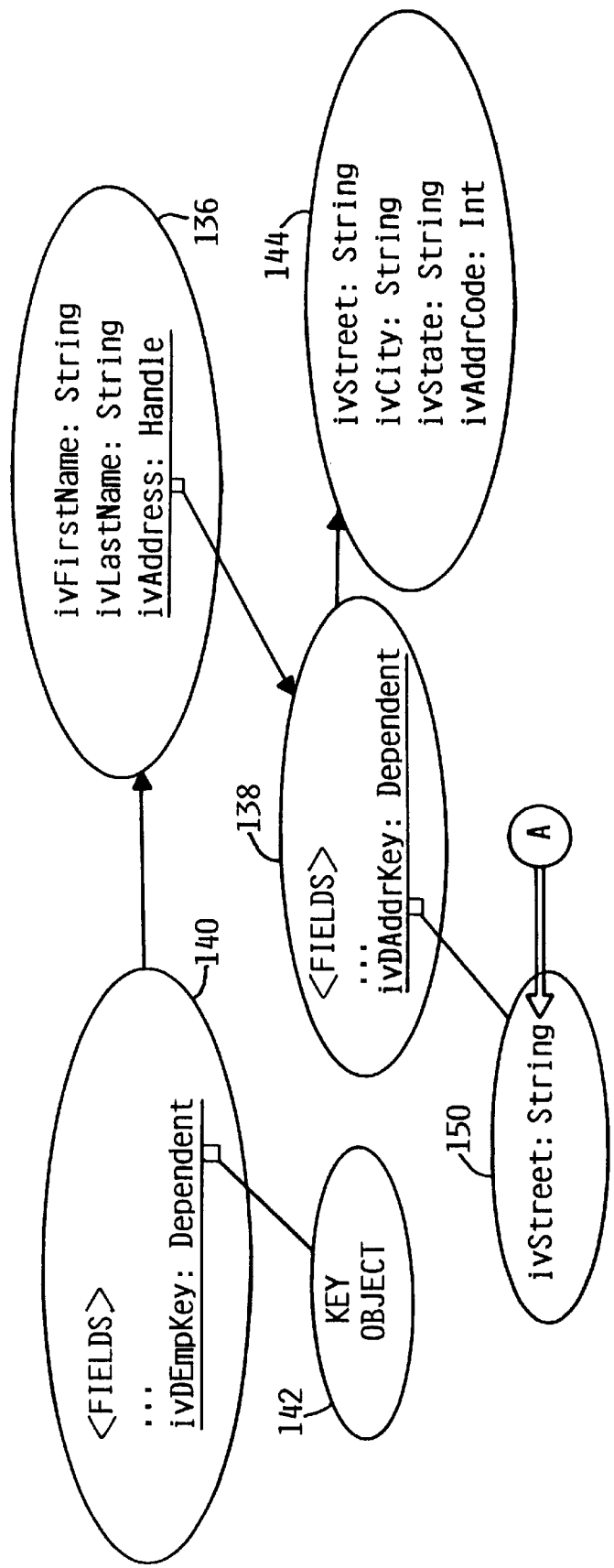
FIG. 8 is an object and database table diagram illustrating a method in which fields of an embedded key object are mapped to columns of a sidetable that is joined to the table via a foreign key relationship.
Figure 8B:
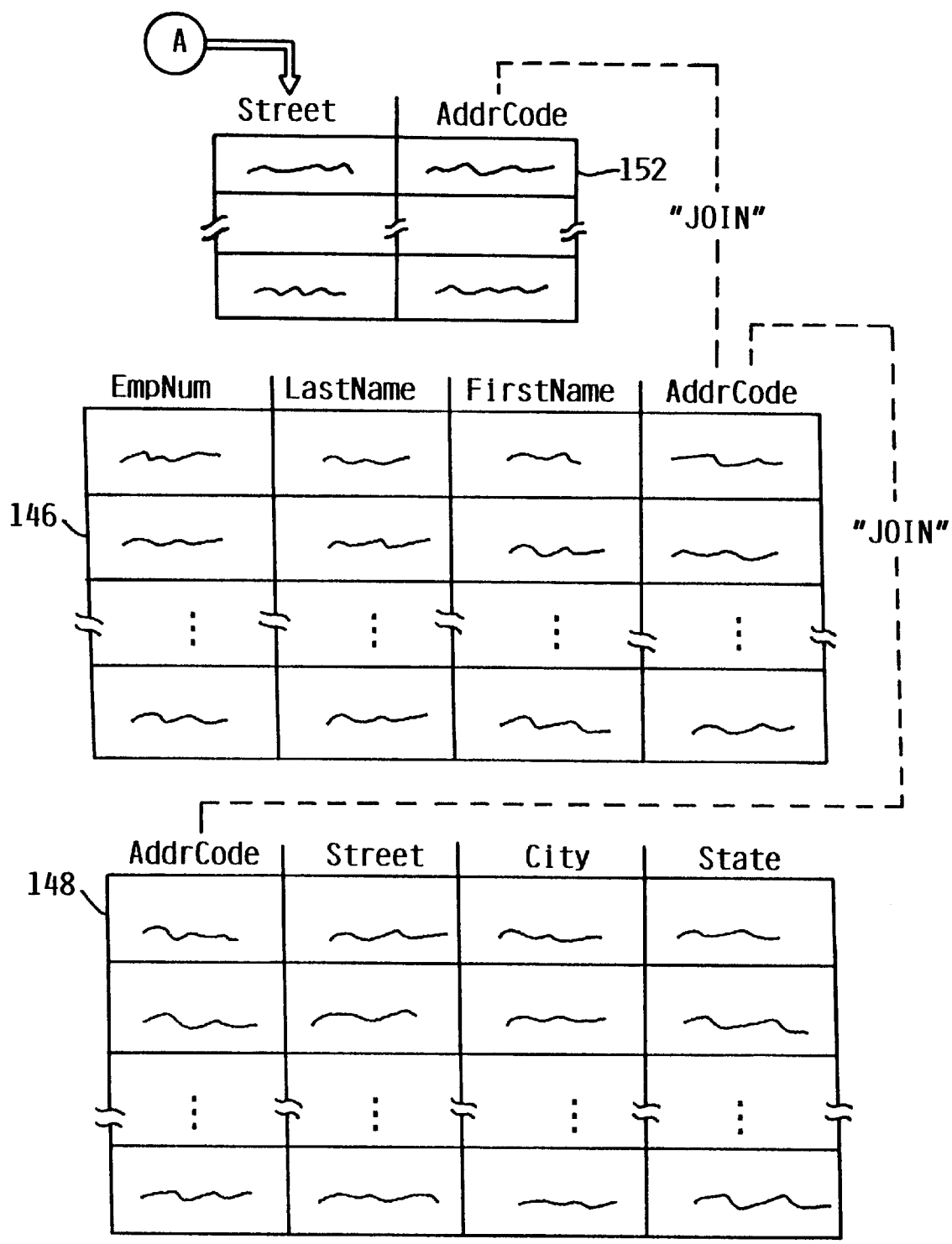

As illustrated in FIG. 8, an entity 136 has fields represented by the same instance variables as described above with respect to FIGS. 6 and 7. A field of class "Handle" references an embedded handle 138 An independent handle 140 references entity 136 and has a key object 142 as in the examples described above. Embedded handle 138 references an address entity 144, which has fields represented by the same instance variables as in those examples. The legacy database includes an employee table 146 and an address table 148.

The object identifier field of handle 138 references a key object 150. As in the example described above with respect to FIG. 7, the key object class does not present with the user with an instance variable that corresponds to a foreign key of table 146. One solution is to add a column, as described above with respect to FIG. 7. Another solution is to add a sidetable in a manner similar to that described above with respect to FIG. 4. A sidetable 152 has a column "Street" defined as a primary key and has a column "AddrCode" defined as a foreign key into the "AddrCode" column of table 146, which is in turn defined as a foreign key into the "AddrCode" column of table 148. Sidetable 152 may be added and maintained by providing a suitable API, as described above with respect to FIG. 4. By adding sidetable 152, the user may select the "ivStreet" instance variable and map it to the "Street" column of sidetable 152, which is defined as a primary key. The following is SML 22 for this example, which has the same run-time effect as described above with respect to FIGS. 6 and 7:

```
CLASS Package.Employee
   PRIMARYKEY Package.DEmpKey
      PRIMARY_KEYFIELD ivEmployeeNbr int COLUMN Employee.EmpNum INTEGER NOTNULL
      PRIMARY_KEYFIELD ivLastName String COLUMN Employee.LastName VARCHAR (20) EXTERNAL
NOTNULL
   END_PRIMARYKEY
   FIELD ivFirstName String COLUMN Employee.FirstName VARCHAR (20) EXTERNAL
   FIELD ivLastName String COLUMN Employee.LastName VARCHAR (20) EXTERNAL
   FIELD ivEmployeeNbr int COLUMN Employee.EmpNum INTEGER NOTNULL
   HANDLE ivAddress Package.Handle
      TLS_USER_DEFINED_HANDLE Package.DaltAddrKey
         CONTAINERID *SAME
         CLASSID ISCONSTANT 'Package.Address'
         FIELD ivStreet String COLUMN AddrSideTable.Street VARCHAR (20) NOTNULL
      END_TLS_USER_DEFINED_HANDLE
   END_HANDLE
   RELATIONSHIP AddrSideTable COLUMN AddrCode JOINTABLE Address JOINCOLUMN AddrCode
         JOINTYPE INNER
END_CLASS
CLASS Package.Address
   PRIMARYKEY Package.DAltAddrKeyObject
      PRIMARY_KEYFIELD ivStreet String COLUMN AddrSideTable.Street VARCHAR (20) NOTNULL
   END_PRIMARYKEY
   FIELD ivAddrCode int COLUMN AddressCode INTEGER NOTNULL
   FIELD ivStreet String COLUMN Street VARCHAR (30) EXTERNAL
   FIELD ivCity COLUMN City VARCHAR (15) EXTERNAL
   FIELD ivState COLUMN State CHAR (2) EXTERNAL
END_CLASS
```

Figure 9A:
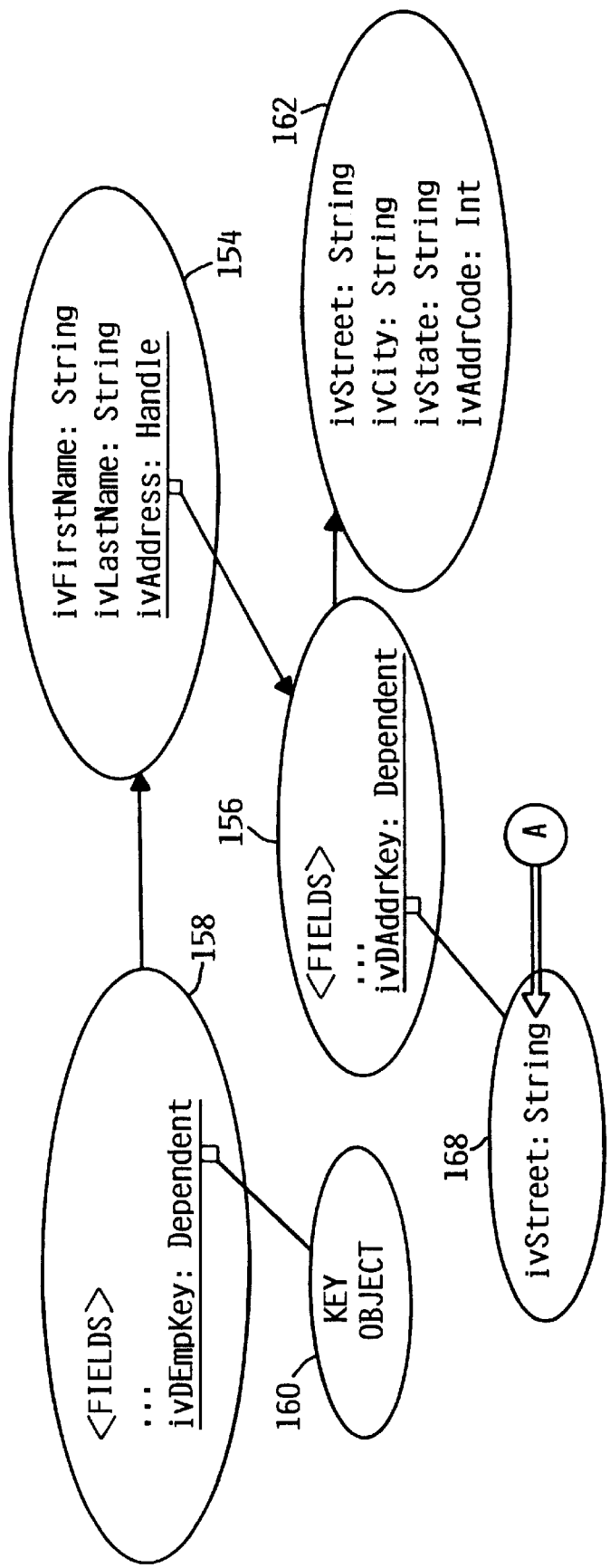
FIG. 9 is similar to FIG. 6, but the mapped field of the embedded key is "hidden," i.e., it does not correspond to any instance variable in the dependent object.
Figure 9B:
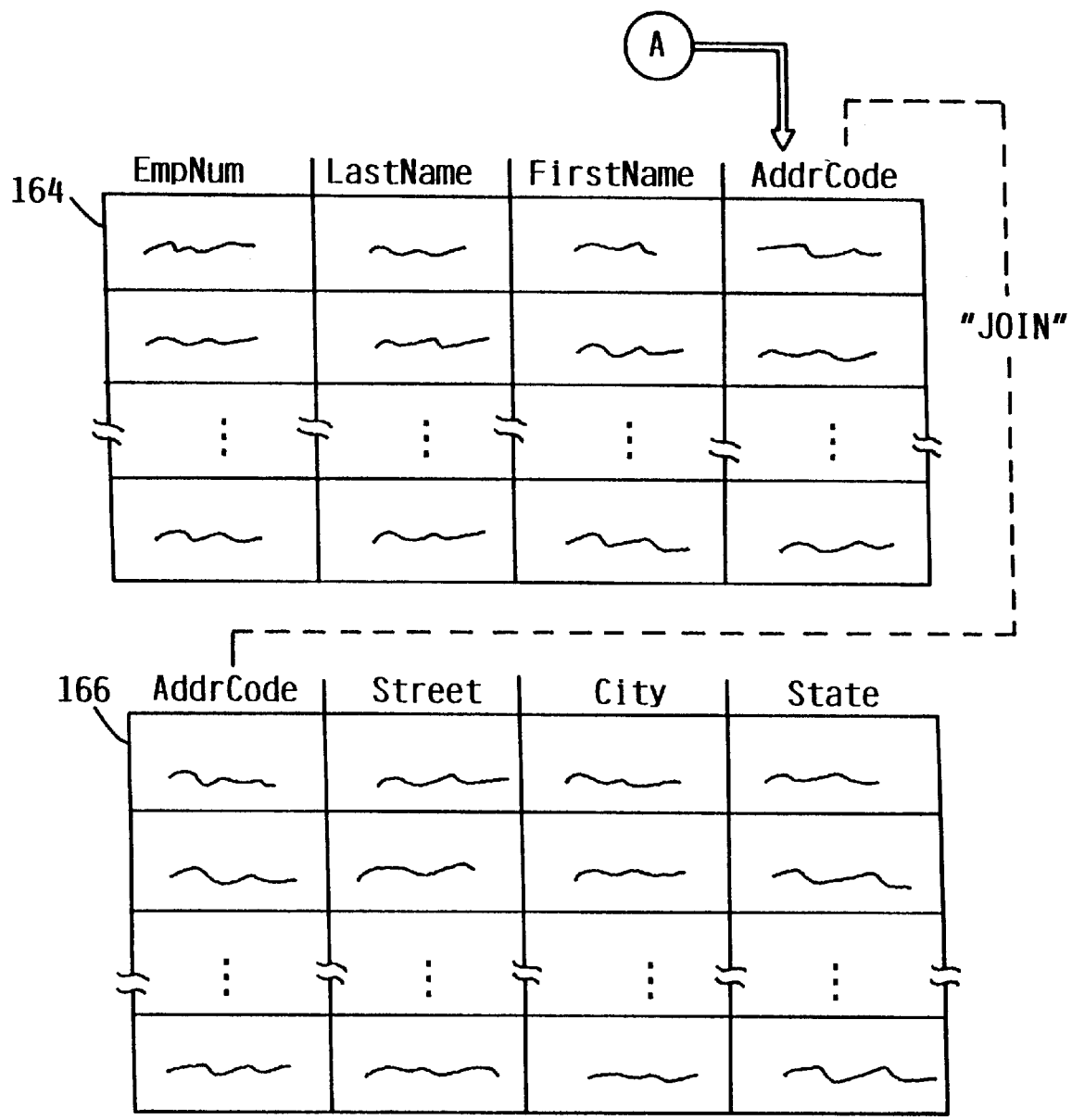

As illustrated in FIG. 9, an entity 154 has fields represented by the same instance variables as described above with respect to FIGS. 6–8. A field of class "Handle" references an embedded handle 156. An independent handle 158 references entity 154 and has a key object 160 as in the examples described above. Embedded handle 156 references an address entity 162, which has fields represented by the same instance variables as in those examples. The legacy database includes an employee table 164 and an address table 166.

The object identifier field of handle 156 references a key object 168. Although this scenario may at first seem similar to the example described above with respect to FIG. 6, the key object class does not present the user with any instance variables corresponding to a foreign key of table 164. The "ivStreet" instance variable may be considered to represent a "hidden field." As in the above examples, the reason why the programmer defined an "ivStreet" instance variable rather than an "ivAddrCode" instance variable in the key object class is unimportant. The programmer may not have anticipated that address codes would be used to link tables or may have believed that a street address was a more useful choice for a foreign key. In an event, the user may select "ivStreet" and map it to the "AddrCode" column. No special API is needed because "ivStreet" never receives any values representing a street address. Rather, when handle 168 is instantiated, it simply receives an address code value. The following is SML 22 for this example:

```
CLASS Package.Employee
    PRIMARYKEY Package.DEmpKey
        PRIMARYKEY_KEYFIELD ivEmployeeNbr int COLUMN Employee.EmpNum INTEGER NOTNULL
        PRIMARYKEY_KEYFIELD ivLastName String COLUMN Employee.LastName VARCHAR(24)
    EXTERNAL NOTNULL
    END_PRIMARYKEY
    FIELD ivFirstName String COLUMN Employee.FirstName VARCHAR(20) EXTERNAL
    FIELD ivLastName String COLUMN Employee.LastNameVARCHAR(20) EXTERNAL
    FIELD ivEmployeeNbr COLUMN Employee.EmpNum VARCHAR(15) EXTERNAL NOTNULL
    HANDLE ivAddress Package.Handle
        TLS_USER_DEFINED_HANDLE Package.DAltAddrKey
            CONTAINERID *SAME
            CLASSID ISCONSTANT 'Package.Address'
            FIELD ivStreet String COLUMN Employee.AddrCode VARCHAR(20) NOTNULL
        END_TLS_USER_DEFINED_HANDLE
    END_HANDLE
END_CLASS
```

As described above, FIGS. 1–5 illustrate mapping methods relating to independent handles, and FIGS. 6–9 illustrate mapping methods relating to embedded handles. It should be noted that these methods may be used in any combination with one another to map an entity's independent handle as well as any embedded handles it may have. Different ones of these methods may be used to map different embedded handles.

As described above, aspects of the present invention pertain to a method and system embodied in a standalone, distributed, or other computer system. Nevertheless, the invention may alternatively be embodied as a computer program product for use with a computer system. The programs defining the SML, run-time code and functions of the present invention can be delivered to a computer system via a variety of signal-bearing media, which may include both recordable-type media and transmission-type media. Examples of recordable-type media include, but are not limited to: (a) information permanently stored on non-writeable storage media (e.g., read-only memory devices within a computer, such as a read-only portion of memory 46 in FIG. 12); and (b) alterable information stored on writeable storage media (e.g., floppy disks within a media drive such as disk drive 62 in FIG. 12). Examples of transmission-type media include conventional computer networks such as network link 54 (FIG. 12), as well as telephone networks, cable television networks, satellite broadcast networks, other wireless communication systems, and combinations thereof. Therefore, it should be understood that such signal-bearing media, when carrying computer readable instructions that direct the method functions of the present invention, represent alternative embodiments of the present invention.

Other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A computer-implemented method for mapping an object having an object class and an independent handle having a handle class between object-oriented schema and relational database schema, said object class defining fields represented by instance variables, said handle class defining fields represented by instance variables, said relational database schema defined by a table having a plurality of columns for storing a persistent state of said object, the method comprising the steps of:

determining whether a group of one or more of said columns is pre-defined as a primary key;

selecting a group of one or more fields represented by instance variables of said handle class defining a unique identity for said object;

generating mapping software code in a high-level language, said mapping software code defining a mapping between said group of columns pre-defined as a primary key and said instance variables representing said fields of said handle class defining a unique identity for said object;

retrieving, in response to an instantiation request at application program runtime, a group of one or more values from said group of one or more columns defined as a primary key; and instantiating a handle object of said handle class in response to said request, said handle object having said instance variables representing said group of one or more fields of said handle class defining a unique identity for said object set to said values in accordance with said mapping.

2. The computer-implemented method recited in claim 1, further comprising the step of:

defining a key object class having fields represented by instance variables;

wherein said selecting step comprises the step of selecting a group of one or more fields represented by instance variables of said key object class, said instance variables of said handle class defining said unique identity for said object.

3. The computer-implemented method recited in claim 1, further comprising the step of:

adding, at application program run-time, when no group of one or more of said columns is predefined as a primary key, a group of one or more additional columns to said table, a resulting group of columns defining a primary key;

wherein said mapping software code defines a mapping between said columns defining a primary key and said instance variables representing said fields of said handle class defining a unique identity for said object; and wherein said instantiating step comprises the step of instantiating a handle object having said instance variables representing said group of one or more fields of said handle class defining a unique identity for said object set to said values in accordance with said mapping.

4. The computer-implemented method recited in claim 3, wherein group of fields of said handle class defining a unique identity for said object include a unique system-generated value identifying said object from all other objects defined by said application program.

5. The computer-implemented method recited in claim 1, further comprising the step of creating a sidetable when a primary key of said table does not correspond to any group of one or more fields of said object, said sidetable having a primary key defined by a group of one or more columns and having a foreign key into a primary key of said table, and wherein:

said mapping software code defines a mapping between said group of one or more columns defined as a primary key of said sidetable and said group of one or more fields represented by instance variables of said handle class defining a unique identity for said object, said group of one or more fields represented by instance variables of said handle class defining a unique identity for said object corresponding to a group of one or more fields represented by instance variables of said object;

said retrieving step comprises retrieving a group of one or more values from said group of one or more columns of said sidetable defining a primary key; and said instantiating step comprises the step of instantiating a handle object having said instance variables representing said group of one or more fields of said handle class defining a unique identity for said object set to said values in accordance with said mapping.

6. The computer-implemented method recited in claim 1, wherein said mapping software code defines, when a primary key of said table does not correspond to any group of one or more fields of said object, a mapping between said group of one or more columns defined as a primary key of said table and said group of one or more fields represented by instance variables of said handle class defining a unique identity for said object, said group of one or more fields represented by instance variables of said handle class defining a unique identity for said object corresponding to said group of one or more columns defined as a primary key of said table but not corresponding to any group of one or more fields represented by instance variables of said object.

7. A computer-implemented method for mapping an object having an object class and referenced by an embedded handle between object-oriented schema and relational database schema, said embedded handle having a handle class, said object class defining fields represented by instance variables, said handle class defining fields represented by instance variables, said relational database schema defined by a table having a plurality of columns, the method comprising the steps of:

determining whether a group of one or more of said columns is pre-defined as a foreign key;

selecting a group of one or more fields represented by instance variables of said handle class defining a unique identity for said object;

generating mapping software code in a high-level language, said mapping software code defining a mapping between said group of columns pre-defined as a foreign key and said instance variables representing said fields of said handle class defining a unique identity for said object;

retrieving, in response to an instantiation request at application program runtime, a group of one or more values from said group of one or more columns defined as a primary key; and instantiating an embedded handle object of said handle class in response to said request, said embedded handle object having said instance variables representing said group of one or more fields of said handle class defining a unique identity for said object set to said values in accordance with said mapping.

8. The computer-implemented method recited in claim 7, further comprising the step of:

defining a key object class having fields represented by instance variables;

wherein said selecting step comprises the step of selecting a group of one or more fields represented by instance variables of said key object class, said instance variables of said handle class defining said unique identity for said object.

9. The computer-implemented method recited in claim 7, further comprising the step of:

adding, at application program run-time, a group of one or more additional columns to said table, a resulting group of columns defining a foreign key into a secondary table for storing a persistent state of said object;

wherein said mapping software code defines a mapping between said columns defining a foreign key and said instance variables representing said fields of said handle class defining a unique identity for said object; and wherein said instantiating step comprises the step of instantiating a handle object having said instance variables representing said group of one or more fields of said handle class defining a unique identity for said object set to said values in accordance with said mapping.

10. The computer-implemented method recited in claim 7, further comprising the step of creating a sidetable having a primary key defined by a group of one or more columns and having a foreign key into a primary key of said table, and wherein:

said mapping software code defines a mapping between said group of one or more columns defined as a primary key of said sidetable and said group of one or more fields represented by instance variables of said handle class defining a unique identity for said object, said group of one or more fields represented by instance variables of said handle class defining a unique identity for said object corresponding to a group of one or more fields represented by instance variables of said object;

said retrieving step comprises retrieving a group of one or more values from said group of one or more columns of said sidetable defining a primary key; and said instantiating step comprises the step of instantiating an embedded handle object having said instance variables representing said group of one or more fields of said handle class defining a unique identity for said embedded object set to said values in accordance with said mapping.

11. The computer-implemented method recited in claim 7, wherein said mapping software code defines, when a foreign key of said table does not correspond to any group of one or more fields of said object, a mapping between said group of one or more columns defined as a primary key of said table and said group of one or more fields represented by instance variables of said handle class defining a unique identity for said object, said group of one or more fields represented by instance variables of said handle class defining a unique identity for said object corresponding to said group of one or more columns defined as a primary key of said table.

12. A system for mapping an object having an object class and an assocated handle having a handle class between object-oriented schema and relational database schema, said object class defining fields represented by instance variables, said handle class defining fields represented by instance variables, said relational database schema defined by a table having a plurality of columns for storing a persistent state of said object, the method comprising the steps of:, the system comprising:

a schema mapping tool for receiving from a user a selection of a group of one or more instance variables defining a unique identity for said object, for receiving from said user a mapping between said instance variables and a key of said relational database schema, and for generating mapping software code in a high-level language in response to said selection and said mapping; and a schema map run-time code generator for instantiating a schema map object and a key object at application program run-time, said schema map object instantiating a handle object in response to a request for restoring an object from a database, said handle object having an object identifier field represented by a group of one or more of said instance variables set to values retrieved from said database in accordance with said mapping.

13. The system recited in claim 12, wherein said key of said relational database schema is a primary key, and said handle is an independent handle.

14. The system recited in claim 12, wherein said key of said relational database schema is an foreign key, and said handle is an embedded handle.

15. A computer program product for mapping an object having an object class and an assocated handle having a handle class between object-oriented schema and relational database schema, said object class defining fields represented by instance variables, said handle class defining fields represented by instance variables, said relational database schema defined by a table having a plurality of columns for storing a persistent state of said object, said computer program product comprising a signal-bearing medium carrying thereon:

a schema mapping tool for receiving from a user a selection of a group of one or more instance variables defining a unique identity for said object, for receiving from said user a mapping between said instance variables and a key of said relational database schema, and for generating mapping software code in a high-level language in response to said selection and said mapping; and a schema map run-time code generator for instantiating a schema map object and a key object at application program run-time, said schema map object instantiating a handle object in response to a request for restoring an object from a database, said handle object having an object identifier field represented by a group of one or more of said instance variables set to values retrieved from said database retrieved in accordance with said mapping.

* * * * *